(12) United States Patent
Mielke et al.

(10) Patent No.: US 8,125,704 B2
(45) Date of Patent: Feb. 28, 2012

(54) SYSTEMS AND METHODS FOR CONTROLLING A PULSED LASER BY COMBINING LASER SIGNALS

(75) Inventors: Michael M. Mielke, Santa Rosa, CA (US); Robert G. Waarts, Los Altos, CA (US); Sha Tong, San Jose, CA (US); Kok Wai Chang, Los Altos, CA (US)

(73) Assignee: Raydiance, Inc., Petaluma, CA (US)

( * ) Notice: Subject to any disclaimer, the term of this patent is extended or adjusted under 35 U.S.C. 154(b) by 401 days.

(21) Appl. No.: 12/229,043

(22) Filed: Aug. 18, 2008

(65) Prior Publication Data

US 2010/0040095 A1    Feb. 18, 2010

(51) Int. Cl.
    *H04B 10/17* (2006.01)
(52) U.S. Cl. .......... 359/341.1; 359/349; 372/25; 372/27
(58) Field of Classification Search ............... 359/341.1, 359/349; 372/25, 27
    See application file for complete search history.

(56) References Cited

U.S. PATENT DOCUMENTS

| | | | |
|---|---|---|---|
| 2,436,662 A | 2/1948 | Norgaard |
| 3,459,960 A | 8/1969 | Aaland et al. |
| 3,549,256 A | 12/1970 | Brienza et al. |
| 3,599,019 A | 8/1971 | Nannichi et al. |
| 3,602,836 A | 8/1971 | Young |
| 3,622,907 A | 11/1971 | Tomlinson et al. |
| 3,626,318 A | 12/1971 | Young |
| 3,628,179 A | 12/1971 | Cuff |
| 3,631,362 A | 12/1971 | Almasi et al. |
| 3,646,469 A | 2/1972 | Buczek et al. |
| 3,654,624 A | 4/1972 | Becker et al. |
| 3,696,308 A | 10/1972 | Duffy et al. |
| 3,735,282 A | 5/1973 | Gans |
| 3,808,549 A | 4/1974 | Maurer |
| 3,851,267 A | 11/1974 | Tanner |
| 3,942,127 A | 3/1976 | Fluhr et al. |

(Continued)

FOREIGN PATENT DOCUMENTS

EP    214100 A    3/1987

(Continued)

OTHER PUBLICATIONS

Stock et al., "Chirped Pulse Amplification in an Erbium-doped Diber Oscillator/Erbium-doped Fiber Amplifier System", Optics Communications, North-Holland Publishing Co., Amsterdam, NL, vol. 106, No. 4/5/06, Mar. 15, 1994, pp. 249-252, XP000429901, ISSN: 0030-4018.

(Continued)

*Primary Examiner* — Eric Bolda
(74) *Attorney, Agent, or Firm* — Carr & Ferrell LLP

(57) ABSTRACT

An ultra-short pulsed laser system comprises an optical combiner, optical amplifier, optical pulse compressor, and optical separator. The optical combiner is configured to combine a primary optical pulse with a secondary optical signal to generate a combined optical signal. The primary optical pulse and the secondary optical signal have a distinguishable characteristic. The optical amplifier is configured to optically amplify the combined optical signal. The optical pulse compressor is configured to compress at least the primary optical pulse contained within the optically amplified combined optical signal and output a compressed combined optical signal. The optical separator is configured to separate the compressed combined optical signal into an output primary optical pulse and an output secondary optical signal according to the distinguishable characteristic.

20 Claims, 10 Drawing Sheets

U.S. PATENT DOCUMENTS

| | | |
|---|---|---|
| 3,963,953 A | 6/1976 | Thornton, Jr. |
| 4,061,427 A | 12/1977 | Fletcher et al. |
| 4,194,813 A | 3/1980 | Benjamin et al. |
| 4,289,378 A | 9/1981 | Remy et al. |
| 4,389,617 A | 6/1983 | Kurnit |
| 4,394,623 A | 7/1983 | Kurnit |
| 4,590,598 A | 5/1986 | O'Harra, II |
| 4,622,095 A | 11/1986 | Grobman et al. |
| 4,655,547 A | 4/1987 | Heritage et al. |
| 4,718,418 A | 1/1988 | L'Esperance, Jr. |
| 4,722,591 A | 2/1988 | Haffner |
| 4,750,809 A | 6/1988 | Kafka et al. |
| 4,808,000 A | 2/1989 | Pasciak |
| 4,815,079 A | 3/1989 | Snitzer et al. |
| 4,824,598 A | 4/1989 | Stokowski |
| 4,827,125 A | 5/1989 | Goldstein |
| 4,829,529 A | 5/1989 | Kafka |
| 4,835,670 A | 5/1989 | Adams et al. |
| 4,847,846 A | 7/1989 | Sone et al. |
| 4,848,340 A | 7/1989 | Bille et al. |
| 4,849,036 A | 7/1989 | Powell et al. |
| 4,902,127 A | 2/1990 | Byer et al. |
| 4,907,586 A | 3/1990 | Bille et al. |
| 4,913,520 A | 4/1990 | Kafka |
| 4,915,757 A | 4/1990 | Rando |
| 4,928,316 A | 5/1990 | Heritage et al. |
| 4,972,423 A | 11/1990 | Alfano et al. |
| 4,983,034 A | 1/1991 | Spillman, Jr. |
| 4,988,348 A | 1/1991 | Bille |
| 5,010,555 A | 4/1991 | Madey et al. |
| 5,014,290 A | 5/1991 | Moore et al. |
| 5,022,042 A | 6/1991 | Bradley |
| 5,031,236 A | 7/1991 | Hodgkinson et al. |
| 5,043,991 A | 8/1991 | Bradley |
| 5,053,171 A | 10/1991 | Portney et al. |
| 5,095,487 A * | 3/1992 | Meyerhofer et al. ........... 372/23 |
| 5,098,426 A | 3/1992 | Sklar et al. |
| 5,122,439 A | 6/1992 | Miersch et al. |
| 5,132,996 A | 7/1992 | Moore et al. |
| 5,146,088 A | 9/1992 | Kingham et al. |
| 5,162,643 A | 11/1992 | Currie |
| 5,166,818 A | 11/1992 | Chase et al. |
| 5,187,759 A | 2/1993 | DiGiovanni et al. |
| 5,204,867 A | 4/1993 | Koschmann |
| 5,206,455 A | 4/1993 | Williams et al. |
| 5,237,576 A | 8/1993 | DiGiovanni et al. |
| 5,265,107 A | 11/1993 | Delfyett, Jr. |
| 5,267,077 A | 11/1993 | Blonder |
| 5,278,853 A | 1/1994 | Shirai et al. |
| 5,291,501 A | 3/1994 | Hanna |
| 5,293,186 A | 3/1994 | Seden et al. |
| 5,302,835 A | 4/1994 | Bendett et al. |
| 5,309,453 A | 5/1994 | Treacy |
| 5,313,262 A | 5/1994 | Leonard |
| 5,315,431 A | 5/1994 | Masuda et al. |
| 5,315,436 A | 5/1994 | Lowenhar et al. |
| 5,329,398 A | 7/1994 | Lai et al. |
| 5,331,131 A | 7/1994 | Opdyke |
| 5,367,143 A | 11/1994 | White, Jr. |
| 5,400,350 A | 3/1995 | Galvanauskas |
| 5,411,918 A | 5/1995 | Keible et al. |
| 5,414,725 A | 5/1995 | Fermann et al. |
| 5,418,809 A | 5/1995 | August, Jr. et al. |
| 5,430,572 A | 7/1995 | DiGiovanni et al. |
| 5,440,573 A | 8/1995 | Fermann |
| 5,446,813 A | 8/1995 | Lee et al. |
| 5,450,427 A | 9/1995 | Fermann et al. |
| 5,479,422 A | 12/1995 | Fermann et al. |
| 5,489,984 A | 2/1996 | Hariharan et al. |
| 5,499,134 A | 3/1996 | Galvanauskas et al. |
| 5,517,043 A | 5/1996 | Ma et al. |
| 5,520,679 A | 5/1996 | Lin |
| 5,548,098 A | 8/1996 | Sugawara et al. |
| 5,572,335 A | 11/1996 | Stevens |
| 5,572,358 A | 11/1996 | Gabl et al. |
| 5,585,642 A | 12/1996 | Britton et al. |
| 5,585,652 A | 12/1996 | Kamasz et al. |
| 5,585,913 A | 12/1996 | Hariharan et al. |
| 5,590,142 A | 12/1996 | Shan |
| 5,592,327 A | 1/1997 | Gabl et al. |
| 5,596,668 A | 1/1997 | DiGiovanni et al. |
| 5,602,673 A | 2/1997 | Swan |
| 5,602,677 A | 2/1997 | Tournois |
| 5,615,043 A | 3/1997 | Plaessmann et al. |
| 5,617,434 A | 4/1997 | Tamura et al. |
| 5,624,587 A | 4/1997 | Otsuki et al. |
| 5,625,544 A | 4/1997 | Kowshik et al. |
| 5,627,848 A | 5/1997 | Fermann et al. |
| 5,631,771 A | 5/1997 | Swan |
| 5,633,750 A | 5/1997 | Nogiwa et al. |
| 5,633,885 A | 5/1997 | Galvanauskas et al. |
| 5,642,447 A | 6/1997 | Pan et al. |
| 5,644,424 A | 7/1997 | Backus et al. |
| 5,651,018 A | 7/1997 | Mehuys et al. |
| 5,656,186 A | 8/1997 | Mourou et al. |
| 5,657,153 A | 8/1997 | Endriz et al. |
| 5,661,829 A | 8/1997 | Zheng |
| 5,663,731 A | 9/1997 | Theodoras, II et al. |
| 5,665,942 A | 9/1997 | Williams et al. |
| 5,666,722 A | 9/1997 | Tamm et al. |
| 5,677,769 A | 10/1997 | Bendett |
| 5,689,361 A | 11/1997 | Damen et al. |
| 5,689,519 A | 11/1997 | Fermann et al. |
| 5,694,501 A | 12/1997 | Alavie et al. |
| 5,696,782 A | 12/1997 | Harter et al. |
| 5,701,319 A | 12/1997 | Fermann |
| 5,703,639 A | 12/1997 | Farrier et al. |
| 5,708,669 A | 1/1998 | DiGiovanni et al. |
| 5,710,424 A | 1/1998 | Theodoras, II et al. |
| 5,720,894 A | 2/1998 | Neev et al. |
| 5,726,855 A | 3/1998 | Mourou et al. |
| 5,734,762 A | 3/1998 | Ho et al. |
| 5,736,709 A | 4/1998 | Neiheisel |
| 5,739,933 A | 4/1998 | Dembeck et al. |
| 5,770,864 A | 6/1998 | Dlugos |
| 5,771,253 A | 6/1998 | Chang-Hasnain et al. |
| 5,778,016 A | 7/1998 | Sucha et al. |
| 5,781,289 A | 7/1998 | Sabsabi et al. |
| 5,788,688 A | 8/1998 | Bauer et al. |
| 5,790,574 A | 8/1998 | Rieger et al. |
| 5,815,519 A | 9/1998 | Aoshima et al. |
| 5,818,630 A | 10/1998 | Fermann et al. |
| 5,822,097 A | 10/1998 | Tournois |
| 5,844,149 A | 12/1998 | Akiyoshi et al. |
| 5,847,825 A | 12/1998 | Alexander |
| 5,847,863 A | 12/1998 | Galvanauskas et al. |
| 5,862,287 A | 1/1999 | Stock et al. |
| 5,862,845 A | 1/1999 | Chin et al. |
| 5,867,304 A | 2/1999 | Galvanauskas et al. |
| 5,875,408 A | 2/1999 | Bendett et al. |
| 5,880,823 A | 3/1999 | Lu |
| 5,880,877 A | 3/1999 | Fermann et al. |
| 5,898,485 A | 4/1999 | Nati, Jr. |
| 5,907,157 A | 5/1999 | Yoshioka et al. |
| 5,920,668 A | 7/1999 | Uehara et al. |
| 5,923,686 A | 7/1999 | Fermann et al. |
| 5,929,430 A | 7/1999 | Yao et al. |
| 5,936,716 A | 8/1999 | Pinsukanjana et al. |
| 5,999,847 A | 12/1999 | Elstrom |
| 6,014,249 A * | 1/2000 | Fermann et al. ........... 359/341.1 |
| 6,016,452 A | 1/2000 | Kasevich |
| 6,020,591 A | 2/2000 | Harter et al. |
| 6,034,975 A | 3/2000 | Harter et al. |
| 6,041,020 A | 3/2000 | Caron et al. |
| 6,061,373 A | 5/2000 | Brockman et al. |
| 6,071,276 A | 6/2000 | Abela |
| 6,072,811 A | 6/2000 | Fermann et al. |
| 6,075,588 A | 6/2000 | Pinsukanjana et al. |
| 6,081,369 A | 6/2000 | Waarts et al. |
| 6,088,153 A | 7/2000 | Anthon et al. |
| 6,099,522 A | 8/2000 | Knopp et al. |
| 6,120,857 A | 9/2000 | Balooch et al. |
| 6,122,097 A | 9/2000 | Weston et al. |
| 6,130,780 A | 10/2000 | Joannopoulos et al. |
| 6,134,003 A | 10/2000 | Tearney et al. |
| 6,141,140 A | 10/2000 | Kim |
| 6,151,338 A | 11/2000 | Grubb et al. |

| | | | | | | |
|---|---|---|---|---|---|---|
| 6,154,310 | A | 11/2000 | Galvanauskas et al. | 6,661,820 B1 | 12/2003 | Camilleri et al. |
| 6,156,030 | A | 12/2000 | Neev | 6,671,298 B1 | 12/2003 | Delfyett et al. |
| 6,161,543 | A | 12/2000 | Cox et al. | 6,677,552 B1 | 1/2004 | Tulloch et al. |
| 6,168,590 | B1 | 1/2001 | Neev | 6,690,686 B2 | 2/2004 | Delfyett et al. |
| 6,175,437 | B1 | 1/2001 | Diels et al. | 6,695,835 B2 | 2/2004 | Furuno et al. |
| 6,181,463 | B1 | 1/2001 | Galvanauskas et al. | 6,696,008 B2 | 2/2004 | Brandinger |
| 6,190,380 | B1 | 2/2001 | Abela | 6,697,402 B2 | 2/2004 | Crawford |
| 6,198,568 | B1 | 3/2001 | Galvanauskas et al. | 6,700,094 B1 | 3/2004 | Kuntze |
| 6,198,766 | B1 | 3/2001 | Schuppe et al. | 6,700,698 B1 | 3/2004 | Scott |
| 6,201,914 | B1 | 3/2001 | Duguay et al. | 6,706,036 B2 | 3/2004 | Lai |
| 6,208,458 | B1 | 3/2001 | Galvanauskas et al. | 6,706,998 B2 | 3/2004 | Cutler |
| 6,246,816 | B1 | 6/2001 | Moore et al. | 6,710,288 B2 | 3/2004 | Liu et al. |
| 6,249,630 | B1 | 6/2001 | Stock et al. | 6,710,293 B2 | 3/2004 | Liu et al. |
| 6,252,892 | B1 | 6/2001 | Jiang et al. | 6,711,334 B2 | 3/2004 | Szkopek et al. |
| 6,256,328 | B1 | 7/2001 | Delfyett et al. | 6,716,475 B1 | 4/2004 | Fink et al. |
| 6,269,108 | B1 | 7/2001 | Tabirian et al. | 6,720,519 B2 | 4/2004 | Liu et al. |
| 6,271,650 | B1 | 8/2001 | Massie et al. | 6,723,991 B1 | 4/2004 | Sucha et al. |
| 6,275,250 | B1 | 8/2001 | Sanders et al. | 6,727,458 B2 | 4/2004 | Smart |
| 6,275,512 | B1 | 8/2001 | Fermann | 6,728,273 B2 | 4/2004 | Perry |
| 6,281,471 | B1 | 8/2001 | Smart | 6,728,439 B2 | 4/2004 | Weisberg et al. |
| 6,290,910 | B1 | 9/2001 | Chalk | 6,735,229 B1 | 5/2004 | Delfyett et al. |
| 6,303,903 | B1 | 10/2001 | Liu | 6,735,368 B2 | 5/2004 | Parker et al. |
| 6,314,115 | B1 | 11/2001 | Delfyett et al. | 6,738,144 B1 | 5/2004 | Dogariu |
| 6,325,792 | B1 | 12/2001 | Swinger et al. | 6,738,408 B2 | 5/2004 | Abedin |
| 6,327,074 | B1 | 12/2001 | Bass et al. | 6,744,555 B2 | 6/2004 | Galvanauskas et al. |
| 6,327,282 | B2 | 12/2001 | Hammons et al. | 6,747,795 B2 | 6/2004 | Lin et al. |
| 6,330,383 | B1 | 12/2001 | Cai et al. | 6,749,285 B2 | 6/2004 | Liu et al. |
| 6,334,011 | B1 | 12/2001 | Galvanauskas et al. | 6,760,356 B2 | 7/2004 | Erbert et al. |
| 6,335,821 | B1 | 1/2002 | Suzuki et al. | 6,774,869 B2 | 8/2004 | Biocca et al. |
| 6,340,806 | B1 * | 1/2002 | Smart et al. ............... 219/121.62 | 6,782,207 B1 | 8/2004 | Biocca et al. |
| RE37,585 | E | 3/2002 | Mourou et al. | 6,785,303 B1 | 8/2004 | Biocca et al. |
| 6,355,908 | B1 | 3/2002 | Tatah et al. | 6,785,445 B2 | 8/2004 | Kuroda et al. |
| 6,362,454 | B1 | 3/2002 | Liu | 6,787,733 B2 | 9/2004 | Lubatschowski et al. |
| 6,365,869 | B1 | 4/2002 | Swain et al. | 6,787,734 B2 | 9/2004 | Liu |
| 6,366,395 | B1 | 4/2002 | Drake et al. | 6,788,864 B2 | 9/2004 | Ahmad et al. |
| 6,370,171 | B1 | 4/2002 | Horn et al. | 6,791,060 B2 | 9/2004 | Dunsky et al. |
| 6,370,422 | B1 | 4/2002 | Richards-Kortum et al. | 6,791,071 B2 | 9/2004 | Woo et al. |
| 6,396,317 | B1 | 5/2002 | Roller et al. | 6,795,461 B1 | 9/2004 | Blair et al. |
| 6,404,944 | B1 | 6/2002 | Wa et al. | 6,801,550 B1 | 10/2004 | Snell et al. |
| 6,407,363 | B2 | 6/2002 | Dunsky et al. | 6,801,551 B1 | 10/2004 | Delfyett et al. |
| 6,418,256 | B1 | 7/2002 | Danziger et al. | 6,801,557 B2 | 10/2004 | Liu |
| 6,421,169 | B1 | 7/2002 | Bonnedal et al. | 6,803,539 B2 | 10/2004 | Liu et al. |
| 6,433,303 | B1 | 8/2002 | Liu et al. | 6,804,574 B2 | 10/2004 | Liu et al. |
| 6,433,305 | B1 | 8/2002 | Liu et al. | 6,807,353 B1 | 10/2004 | Fleming et al. |
| 6,433,760 | B1 | 8/2002 | Vaissie et al. | 6,807,375 B2 | 10/2004 | Dogariu |
| 6,463,314 | B1 | 10/2002 | Haruna | 6,815,638 B2 | 11/2004 | Liu |
| 6,482,199 | B1 | 11/2002 | Neev | 6,819,694 B2 | 11/2004 | Jiang et al. |
| 6,485,413 | B1 | 11/2002 | Boppart et al. | 6,819,702 B2 | 11/2004 | Sverdlov et al. |
| 6,486,435 | B1 | 11/2002 | Beyer et al. | 6,819,837 B2 | 11/2004 | Li et al. |
| 6,501,590 | B2 | 12/2002 | Bass et al. | 6,822,251 B1 | 11/2004 | Arenberg et al. |
| 6,522,460 | B2 | 2/2003 | Bonnedal et al. | 6,824,540 B1 | 11/2004 | Lin |
| 6,522,674 | B1 | 2/2003 | Niwano et al. | 6,829,517 B2 | 12/2004 | Cheng et al. |
| 6,525,873 | B1 | 2/2003 | Gerrish et al. | 6,834,134 B2 | 12/2004 | Brennan, III et al. |
| 6,526,085 | B2 | 2/2003 | Vogler et al. | 6,878,900 B2 | 4/2005 | Corkum et al. |
| 6,526,327 | B2 | 2/2003 | Kar et al. | 6,882,772 B1 | 4/2005 | Lowery et al. |
| 6,529,319 | B2 | 3/2003 | Youn et al. | 6,885,683 B1 | 4/2005 | Fermann et al. |
| 6,541,731 | B2 * | 4/2003 | Mead et al. ................ 219/121.7 | 6,887,804 B2 | 5/2005 | Sun et al. |
| 6,549,547 | B2 | 4/2003 | Galvanauskas et al. | 6,897,405 B2 | 5/2005 | Cheng et al. |
| 6,552,301 | B2 | 4/2003 | Herman et al. | 6,902,561 B2 | 6/2005 | Kurtz et al. |
| 6,555,781 | B2 | 4/2003 | Ngoi et al. | 6,917,631 B2 | 7/2005 | Richardson et al. |
| 6,556,733 | B2 | 4/2003 | Dy et al. | 6,928,490 B1 | 8/2005 | Bucholz et al. |
| 6,567,431 | B2 | 5/2003 | Tabirian et al. | 6,937,629 B2 | 8/2005 | Perry et al. |
| 6,573,813 | B1 | 6/2003 | Joannopoulos et al. | 6,943,359 B2 | 9/2005 | Vardeny et al. |
| 6,574,024 | B1 | 6/2003 | Liu | 6,956,680 B2 | 10/2005 | Morbieu et al. |
| 6,574,250 | B2 | 6/2003 | Sun et al. | 7,006,730 B2 | 2/2006 | Doerr |
| 6,576,917 | B1 | 6/2003 | Silfvast | 7,022,119 B2 | 4/2006 | Hohla |
| 6,580,553 | B2 | 6/2003 | Kim et al. | 7,031,571 B2 | 4/2006 | Mihailov et al. |
| 6,587,488 | B1 | 7/2003 | Meissner et al. | 7,068,408 B2 | 6/2006 | Sakai |
| 6,597,497 | B2 | 7/2003 | Wang et al. | 7,072,101 B2 | 7/2006 | Kapteyn et al. |
| 6,603,903 | B1 | 8/2003 | Tong et al. | 7,088,756 B2 | 8/2006 | Fermann et al. |
| 6,603,911 | B2 | 8/2003 | Fink et al. | 7,095,772 B1 | 8/2006 | Delfyett et al. |
| 6,621,040 | B1 | 9/2003 | Perry et al. | 7,099,549 B2 | 8/2006 | Scheuer et al. |
| 6,621,045 | B1 | 9/2003 | Liu et al. | 7,116,688 B2 | 10/2006 | Sauter et al. |
| 6,627,421 | B1 | 9/2003 | Unger et al. | 7,132,289 B2 | 11/2006 | Kobayashi et al. |
| 6,627,844 | B2 | 9/2003 | Liu et al. | 7,143,769 B2 | 12/2006 | Stoltz et al. |
| 6,642,477 | B1 | 11/2003 | Patel et al. | 7,171,074 B2 | 1/2007 | DiGiovanni et al. |
| 6,647,031 | B2 | 11/2003 | Delfyett et al. | 7,217,266 B2 | 5/2007 | Anderson et al. |
| 6,654,161 | B2 | 11/2003 | Bass et al. | 7,220,255 B2 | 5/2007 | Lai |
| 6,661,816 | B2 | 12/2003 | Delfyett et al. | 7,233,607 B2 | 6/2007 | Richardson et al. |

| | | |
|---|---|---|
| 7,257,302 B2 | 8/2007 | Fermann et al. |
| 7,321,605 B2 | 1/2008 | Albert |
| 7,321,713 B2 | 1/2008 | Akiyama et al. |
| 7,332,234 B2 | 2/2008 | Levinson et al. |
| 7,349,452 B2 | 3/2008 | Brennan, III et al. |
| 7,361,171 B2 | 4/2008 | Stoltz et al. |
| 7,367,969 B2 | 5/2008 | Stoltz et al. |
| 7,444,049 B1 | 10/2008 | Kim et al. |
| 7,518,788 B2 | 4/2009 | Fermann et al. |
| 7,584,756 B2 | 9/2009 | Zadoyan et al. |
| 7,787,175 B1 | 8/2010 | Brennan, III et al. |
| 7,822,347 B1 | 10/2010 | Brennan, III et al. |
| 2001/0009250 A1 | 7/2001 | Herman et al. |
| 2001/0021294 A1 | 9/2001 | Cai et al. |
| 2001/0046243 A1 | 11/2001 | Schie |
| 2002/0003130 A1 | 1/2002 | Sun et al. |
| 2002/0051606 A1 | 5/2002 | Takushima et al. |
| 2002/0071454 A1 | 6/2002 | Lin |
| 2002/0091325 A1 | 7/2002 | Ostrovsky |
| 2002/0095142 A1 | 7/2002 | Ming |
| 2002/0097468 A1 | 7/2002 | Mecherle et al. |
| 2002/0097761 A1 | 7/2002 | Sucha et al. |
| 2002/0153500 A1 | 10/2002 | Fordahl et al. |
| 2002/0167581 A1* | 11/2002 | Cordingley et al. .......... 347/173 |
| 2002/0176676 A1 | 11/2002 | Johnson et al. |
| 2002/0186915 A1 | 12/2002 | Yu et al. |
| 2002/0191901 A1 | 12/2002 | Jensen |
| 2003/0011782 A1 | 1/2003 | Tanno |
| 2003/0031410 A1 | 2/2003 | Schnitzer |
| 2003/0039442 A1 | 2/2003 | Bond et al. |
| 2003/0053508 A1 | 3/2003 | Dane et al. |
| 2003/0055413 A1 | 3/2003 | Altshuler et al. |
| 2003/0060808 A1 | 3/2003 | Wilk |
| 2003/0086647 A1 | 5/2003 | Willner et al. |
| 2003/0095266 A1 | 5/2003 | Detalle et al. |
| 2003/0123496 A1 | 7/2003 | Broutin et al. |
| 2003/0142705 A1 | 7/2003 | Hackel et al. |
| 2003/0156605 A1 | 8/2003 | Richardson et al. |
| 2003/0161365 A1 | 8/2003 | Perry et al. |
| 2003/0161378 A1 | 8/2003 | Zhang et al. |
| 2003/0178396 A1 | 9/2003 | Naumov et al. |
| 2003/0202547 A1 | 10/2003 | Fermann et al. |
| 2003/0205561 A1* | 11/2003 | Iso ........................... 219/121.71 |
| 2003/0214714 A1 | 11/2003 | Zheng |
| 2003/0223689 A1 | 12/2003 | Koch et al. |
| 2003/0235381 A1 | 12/2003 | Hunt |
| 2004/0000942 A1 | 1/2004 | Kapteyn et al. |
| 2004/0037505 A1 | 2/2004 | Morin |
| 2004/0042061 A1 | 3/2004 | Islam et al. |
| 2004/0049552 A1 | 3/2004 | Motoyama et al. |
| 2004/0101001 A1* | 5/2004 | Bergmann et al. .............. 372/25 |
| 2004/0128081 A1 | 7/2004 | Rabitz et al. |
| 2004/0134894 A1 | 7/2004 | Gu et al. |
| 2004/0134896 A1* | 7/2004 | Gu et al. ................. 219/121.69 |
| 2004/0226925 A1 | 11/2004 | Gu et al. |
| 2004/0231682 A1 | 11/2004 | Stoltz et al. |
| 2004/0233944 A1 | 11/2004 | Dantus et al. |
| 2004/0263950 A1 | 12/2004 | Fermann et al. |
| 2005/0008044 A1 | 1/2005 | Fermann et al. |
| 2005/0018986 A1 | 1/2005 | Argyros et al. |
| 2005/0035097 A1 | 2/2005 | Stoltz |
| 2005/0036527 A1 | 2/2005 | Khazaei et al. |
| 2005/0038487 A1 | 2/2005 | Stoltz |
| 2005/0061779 A1 | 3/2005 | Blumenfeld et al. |
| 2005/0065502 A1 | 3/2005 | Stoltz |
| 2005/0067388 A1* | 3/2005 | Sun et al. ................. 219/121.61 |
| 2005/0074974 A1 | 4/2005 | Stoltz |
| 2005/0077275 A1 | 4/2005 | Stoltz |
| 2005/0105865 A1 | 5/2005 | Fermann et al. |
| 2005/0107773 A1 | 5/2005 | Bergt et al. |
| 2005/0111073 A1 | 5/2005 | Pan et al. |
| 2005/0111500 A1 | 5/2005 | Harter et al. |
| 2005/0127049 A1 | 6/2005 | Woeste et al. |
| 2005/0154380 A1 | 7/2005 | DeBenedictis et al. |
| 2005/0163426 A1 | 7/2005 | Fermann et al. |
| 2005/0167405 A1 | 8/2005 | Stoltz et al. |
| 2005/0171516 A1 | 8/2005 | Stoltz et al. |
| 2005/0171518 A1 | 8/2005 | Stoltz et al. |
| 2005/0175280 A1 | 8/2005 | Nicholson |
| 2005/0177143 A1 | 8/2005 | Bullington et al. |
| 2005/0195726 A1 | 9/2005 | Bullington et al. |
| 2005/0213630 A1 | 9/2005 | Mielke et al. |
| 2005/0215985 A1 | 9/2005 | Mielke et al. |
| 2005/0218122 A1* | 10/2005 | Yamamoto et al. ...... 219/121.61 |
| 2005/0226278 A1 | 10/2005 | Gu et al. |
| 2005/0226286 A1 | 10/2005 | Liu et al. |
| 2005/0226287 A1* | 10/2005 | Shah et al. ........................ 372/25 |
| 2005/0232560 A1 | 10/2005 | Knight et al. |
| 2005/0238070 A1 | 10/2005 | Imeshev et al. |
| 2005/0259944 A1 | 11/2005 | Anderson et al. |
| 2005/0265407 A1 | 12/2005 | Braun et al. |
| 2005/0271094 A1 | 12/2005 | Miller et al. |
| 2005/0271340 A1 | 12/2005 | Weisberg et al. |
| 2006/0016891 A1 | 1/2006 | Giebel et al. |
| 2006/0030951 A1 | 2/2006 | Davlin et al. |
| 2006/0050750 A1 | 3/2006 | Barty |
| 2006/0056480 A1 | 3/2006 | Mielke et al. |
| 2006/0064079 A1 | 3/2006 | Stoltz et al. |
| 2006/0067604 A1 | 3/2006 | Bull et al. |
| 2006/0084957 A1 | 4/2006 | Delfyett et al. |
| 2006/0093012 A1 | 5/2006 | Singh et al. |
| 2006/0093265 A1 | 5/2006 | Jia et al. |
| 2006/0120418 A1 | 6/2006 | Harter et al. |
| 2006/0126679 A1 | 6/2006 | Brennan, III et al. |
| 2006/0131288 A1* | 6/2006 | Sun et al. ................. 219/121.69 |
| 2006/0187974 A1 | 8/2006 | Dantus |
| 2006/0209908 A1 | 9/2006 | Pedersen et al. |
| 2006/0210275 A1 | 9/2006 | Vaissie et al. |
| 2006/0221449 A1 | 10/2006 | Glebov et al. |
| 2006/0250025 A1 | 11/2006 | Kitagawa et al. |
| 2006/0268949 A1 | 11/2006 | Gohle et al. |
| 2007/0025728 A1 | 2/2007 | Nakazawa et al. |
| 2007/0047965 A1 | 3/2007 | Liu et al. |
| 2007/0064304 A1 | 3/2007 | Brennan, III |
| 2007/0106416 A1 | 5/2007 | Griffiths et al. |
| 2007/0196048 A1 | 8/2007 | Galvanauskas et al. |
| 2007/0229939 A1 | 10/2007 | Brown et al. |
| 2007/0253455 A1 | 11/2007 | Stadler et al. |
| 2007/0273960 A1 | 11/2007 | Fermann et al. |
| 2008/0232407 A1 | 9/2008 | Harter et al. |
| 2009/0245302 A1 | 10/2009 | Baird et al. |
| 2009/0273828 A1* | 11/2009 | Waarts et al. ............... 359/341.1 |
| 2009/0297155 A1 | 12/2009 | Weiner et al. |
| 2010/0118899 A1 | 5/2010 | Peng et al. |

FOREIGN PATENT DOCUMENTS

| | | |
|---|---|---|
| EP | 691563 A2 | 1/1996 |
| EP | 1462831 A1 | 9/2004 |
| JP | 8171103 | 7/1996 |
| JP | 11189472 A | 7/1999 |
| JP | 2003181661 A | 7/2003 |
| JP | 2003344883 | 12/2003 |
| JP | 2005174993 | 6/2005 |
| WO | WO9428972 A1 | 12/1994 |
| WO | WO2004105100 A2 | 12/2004 |
| WO | WO2004114473 A2 | 12/2004 |
| WO | WO2005018060 A2 | 2/2005 |
| WO | WO2005018061 A2 | 2/2005 |
| WO | WO2005018062 A2 | 2/2005 |
| WO | WO2005018063 A2 | 2/2005 |

OTHER PUBLICATIONS

Strickland et al., "Compression of Amplified Chirped Optical Pulses", Optics Communications, North-Holland Publishing Co., Amersterdam, NL, vol. 56, No. 3, Dec. 1, 1985, pp. 219-221, XP024444933 ISSN: 0030-4018 (retrieved on Dec. 011, 1985.

Temelkuran, B. et al., "Wavelength-scalable Hollow Optical Fibres with Large Photonic Bandgaps for CO2 Laser Transmission," Nature, Dec. 12, 2002, pp. 650-653.

Thurston, R.N. et al., "Analysis of Picosecond Pulse Shape Synthesis by Spectral Masking in a Grating Pulse Compressor," IEEE Journal of Quantum Electronics, vol. EQ-22, No. 5, pp. 682-696, May 1986.

Weiner, A.M. et al., "Synthesis of Phase-coherent, Picosecond Optical Square Pulses," Optics Letters, vol. 11, No. 3, pp. 153-155, Mar. 1986.

Weiner, A.M., "Femtosecond Optical Pulse Shaping and Processing," Prog. Quant. Electr. 1995, vol. 19, pp. 161-237, 1995.

Weiner, A.M., "High-resolution femtosecond Pulse Shaping," Journal of the Optical Society of America B. vol. 5, No. 8, pp. 1563-1572, Aug. 1988.
Wells, D.J., "Gene Therapy Progress and Prospects: electroporation and Other Physical Methods," Gene Therapy, Nature Publishing Group, vol. 11, pp. 1363-1369, Aug. 5, 2004, (http://www.nature.com/gt).
White, W.E., et al., "Compensation of Higher-order Frequency-dependent Phase Terms in Chirped-pulse Amplification Systems," Optics Letters, vol. 18, No. 16, pp. 1343-1345, Aug. 15, 1993.
Yamakawa et al., "1 Hz, 1 ps, terawatt Nd: glass laser", Optics Communications, North-Holland Publishing Co. Amsterdam, NL, vol. 112, No. 1-2, Nov. 1, 1994, pp. 37-42, XP024424285.
Yan et al., Ultrashort Pulse Measurement Using Interferometric Autocorrelator Based on Two-photon-absorbtion Detector at 1.55 μm Wavelength Region., 2005, Proceedings of SPIE vol. 5633, Advanced Materials and Devices for Sensing and Imaging II, pp. 424-429.
Yeh, et al. "Theory of Bragg Fiber", Journal of the Optical Society America, Sep. 1978, p. 1196, vol. 68, No. 9., pp. 1196-1201.
Yi, Y. et al., "Sharp Bending of On-Chip silicon Bragg Cladding Waveguide With Light Guiding on Low Index Core Materials", IEEE Journal of Selected Topics in Quantum Electronics, vol. 12, No. 6, Nov./Dec. 2006, pp. 1345-1348.
Yi, Y., et al., "On-chip Si-based Bragg Cladding Waveguide with High Index Contrast Bilayers", Optics Express, vol. 12, No. 20, Oct. 4, 2004, pp. 4775-4780.
Yin, D. et al., "Integrated ARROW Waveguides with Hollow Cores", Optics Express, vol. 12, No. 12, Jun. 14, 2004, pp. 2710-2715.
Zhou, S. et al., "Compensation of nonlinear Phase Shifts with Third-order Dispersion in Short-pulse Fiber Amplifiers," Optics Express, vol. 13, No. 13, pp. 4869-2877, Jun. 27, 2005.
Limpert et al., "All Fiber Chiped-Pulse Amplification System Based on Compression in Air-Guiding Photonic Bandgap Fiber", Optics Express, Dec. 1, 2003, vol. 11, No. 24, pp. 3332-3337.
Agostinelli, J. et al., "Optical Pulse Shaping with a Grating Pair," Applied Optics, vol. 18, No. 14, pp. 2500-2504, Jul. 15, 1979.
Anastassiou et al., "Photonic Bandgap Fibers Exploiting Omnidirectional Reflectivity Enable Flexible Delivery of Infrared Lasers for Tissue Cutting," Proceedings of the SPIE—the International Society for Optical Engineering, SPIE, US, vol. 5317, No. 1, Jan. 1, 2004, pp. 29-38, XP002425586 ISSN: 0277-786X.
Benoit, G. et al., "Dynamic All-optical Tuning of Transverse Resonant Cavity Modes in Photonic Bandgap Fibers,"Optics Letters, vol. 30, No. 13, Jul. 1, 2005, pp. 1620-1622.
Chen, L. et al., "Ultrashort Optical Pulse Interaction with Fibre Gratings and Device Applications," 1997, Canaga, located at http://www.collectionscanada.ca/obj/s4/f2/dsk2/ftp04/mq29402.pfd.
Chen, X. et al., "Highly Birefringent Hollow-core Photonic Bandgap Fiber," Optics Express, vol. 12, No. 16, Aug. 9, 2004, pp. 3888-3893.
Chen, Y. et al., "Dispersion-Managed Mode Locking", Journal of the Optical Society of America B, Nov. 1999, pp. 1999-2004, vol. 16, No. 11, Optical Society of America.
Dasgupta, S. et al., "Design of Dispersion-Compensating Bragg Fiber with an Ultrahigh Figure of Merit," Optics Letters, Aug. 1, 2005, vol. 30, No. 15, Optical Society of America.
De Matos et al., "Multi-kilowatt, Picosecond Pulses from an All-fiber Chirped Pulse Amplification System Using Air-core Photonic Bandgalp Fiber", Lasers and Electro-optics, 2004, (CLEO), Conference on San Francisco, CA USA, May 20-21, 2004, Piscataway, NJ, USA, IEEE, Vol. May 17, 2004, pp. 973-974, XP010745448 ISBN: 978-1-55752-777-6.
De Matos, C.J.S. et al., "All-fiber Chirped Pulse Amplification using Highly-dispersive Air-core Photonic Bandgap Fiber," Nov. 3, 2003, Optics Express, pp. 2832-2837, vol. 11, No. 22.
Delfyett, P. et al., "Ultrafast Semiconductor Laser-Diode-Seeded Cr:LiSAF Rengerative Amplifier System", Applied Optics, May 20, 1997, pp. 3375-3380, vol. 36, No. 15, Octoical Society of America.
Eggleton, et al., "Electrically Tunable Power Efficient Dispersion Compensating Fiber Bragg Grating," IEEE Photonics Technology Letters, vol. 11, No. 7, pp. 854-856, Jul. 1999.
Engeness et al., "Dispersion Tailoring and Compensation by Modal Interations in Omniguide Fibers," Optics Express, May 19, 2003, pp. 1175-1196, vol. 11, No. 10.
Fink et al., "Guiding Optical Light in Air Using an All-Dielectric Structure," Journal of Lightwave Technology, Nov. 1999, pp. 2039-2041, vol. 17, No. 11.
Folkenberg, J.R., et al., "Broadband Single-polarization Photonic Crystal Fiber," Optics Letters, vol. 30, No. 12, Jun. 15, 2005, pp. 1446-1448.
Folkenberg, J.R., et al., "Polarization Maintaining Large Mode Area Photonic Crystal Fiber," Optics Express vol. 12, No. 5, Mar. 8, 2004, pp. 956-960.
Futami, F., et al., "Wideband Fibre Dispersion Equalisation up to Fourth-order for Long-distance Sub-picosecond Optical Pulse Transmission," Electronics Letters, vol. 35, No. 25, Dec. 9, 1999.
Galvanauskas, A. et al., "Chirped-pulse-amplification Circuits for Fiber Amplifiers, Based on Chirped-period Quasi-phase, matching gratings", Optics Letters, Nov. 1, 1998, p. 1695-1697, vol. 23, No. 21, Optical Society of America.
Hartl et al., "In-line high energy Yb Fiber Laser Based Chirped Pulse Amplifier System", Laser and Electro-Optics, 2004, (CLEO) Conference of San Francisco, CA USA May 20-21, 2004, Piscataway, NJ, USA, IEEE, vol. 1, May 17, 2004, pp. 563-565, XP010745382, ISBN: 978-1-55752-7777.
Hellstrom, E. et al., "Third-order Dispersion Compensation Using a Phase Modulator", Journal of Lightwave Technology, vol. 21, No. 5, pp. 1188-1197, May 2003.
Heritage, J. P. et al., "Picosecond Pulse Shaping by Spectral Phase and Amplitude Manipulation," Optics Letters, vol. 10, No. 12, pp. 609-611, Dec. 1985.
Heritage, J.P. et al., "Spectral Windowing of Frequency-Modulated Optical Pulses in a Grating Compressor," Applied Physics Letters, vol. 47, No. 2, pp. 87-89, Jul. 15, 1985.
Hill, K. et al., "Fiber Bragg Grating Technology Fundamentals and Overview," Journal of Lightwave Technology, Aug. 1997, vol. 15, No. 8, pp. 1263-1276.
Ibanescu et al., "Analysis of Mode Structure in Hollow Dielctric Waveguide Fibers," Physical Review E 67, 2003, The American Physical Society.
Jiang, et al., "Fully Dispersion Compensated ~500 fs Pulse Transmission Over 50 km Single Mode Fiber," Optics Letters, vol. 30, No. 12, pp. 1449-1451, Jun. 15, 2005.
Jiang, et al., "Fully Dispersion Compensated ~500 fs Pulse Transmission Over 50 km Single Mode Fiber," Purdue University ECE Annual Research Summary, Jul. 1, 2004-Jun. 30, 2005.
Killey, et al., "Electronic Dispersion Compensation by Signal Predistortion Using Digital Processing and a Dual-Drive Mach-Zehnder Modulator," IEEE Photonics Technology Letters, vol. 17, No. 3, pp. 714-716, Mar. 2005.
Kim, K. et al., "1.4kW High Peak Power Generation from an All Semiconductor Mode-locked Master Oscillator Power Amplifier System Based on eXtreme Chirped Pulse Amplification (X-CPA)", Optics Express, Jun. 2, 2005, pp. 4600-4606, vol. 13, No. 12.
Koechner, "Solid State Laser Engineering", Oct. 29, 1999, Section 5.5, pp. 270-277, 5th Edition, Springer.
Kwon, et al., "Tunable Dispersion Slope Compensator Using a Chirped Fiber Bragg Grating Tuned by a Fan-shaped Thin Metallic Heat Channel," IEEE Photonics Technology Letters, vol. 18, No. 1, pp. 118-120, Jan. 1, 2006.
Kyungbum, Kim et al., "1.4kW High Peak Power Generation from an all Semiconductor Mode-locked Master Oscillator Power Amplifier System Based on eXtreme Chirped Pulse Amplification (X-CPA)", Optics Express, Jun. 2, 2005, pp. 4600-4606, vol. 13, No. 12.
Levy et al., "Engineering Space-Variant Inhomogeneous Media for Polarization Control," Optics Letters, Aug. 1, 2004, pp. 1718-1720, vol. 29, No. 15, Optical Society of America.
Liao, K. et al., "Large-aperture Chirped Volume Bragg Grating Based Fiber CPA System," Optics Express, Apr. 16, 2007, vol. 15, No. 8, pp. 4876-4882.
Lo, S. et al., "Semiconductor Hollow Optical Waveguides Formed by Omni-directional Reflectors", Optics Express, vol. 12, No. 26, Dec. 27, 2004, pp. 6589-6593.

Malinowski A. et al., "Short Pulse High Power Fiber Laser Systems," Proceedings of the 2005 Conference on Lasers and Electro-Optics (CLEO), Paper No. CThG3, pp. 1647-1649, May 26, 2005.

Mehier-Humbert, S. et al., "Physical Methods for Gene Transfer: Improving the Kinetics of Gene Delivery Into Cells," Advanced Drug Delivery Reviews, vol. 57, pp. 733-753, 2005.

Mohammed, W. et al., "Selective Excitation of the TE01 Mode in Hollow-Glass Waveguide Using a Subwavelength Grating," IEEE Photonics Technology Letters, Jul. 2005, vol. 17, No. 7, IEEE.

Nibbering, E.T.J., et al. "Spectral Determination of the Amplitude and the Phase of Intense Ultrashort Optical Pulses," Journal Optical Society of America B, vol. 13, No. 2, pp. 317-329, Feb. 1996.

Nicholson, J. et al., "Propagation of Femotsecond Pulses in Large-mode-area, Higher-order-mode Fiber," Optics Letters, vol. 31, No. 21, 2005, pp. 3191-3193.

Noda, J. et al., "Polarization-maintaining Fibers and Their Applications", Journal of Lightwave Technology, vol. Lt-4, No. 8 Aug. 1986, pp. 1071-1089.

Palfrey et al., "Generation of 16-FSEC Frequency-tunable Pulses by Optical Pulse compression" Optics Letters, OSA, Optical Society of america, Washington, DC, USA, vol. 10, No. 11, Nov. 1, 1985, pp. 562-564, XP000710358 ISSN: 0146-9592.

Pelusi, M. D. et al., "Electrooptic Phase Modulation of Stretched 250-fs Pulses for Suppression of Third-Order Fiber Disperson in Transmission," IEEE Photonics Technology Letters, vol. 11, No. 11, pp. 1461-1463, Nov. 1999.

Pelusi, M. D., et al., "Phase Modulation of Stretched Optical Pulses for Suppression of Third-order Dispersion Effects in fibre Transmission," Electronics Letters, vol. 34, No. 17, pp. 1675-1677, Aug. 20, 1998.

Price et al., "Advances in High Power, Short Pulse, Fiber Laser Systems and Technology", Proceedings of SPIE—vol. 5709, Fiber Lasers II: Technology, Systems, and Applications, Apr. 2005, pp. 184-192.

Price et al., "Advances in High Power, Short Pulse, Fiber Laser Systems and Technology", Photonics West 2005, San Jose, California, Jan. 2005, pp. 5709-3720.

Ramachandran, S., et al., "High-power Amplification in a 2040-µm2 Higher Order Mode," SPIE Photonics West 2007, Post-deadline.

Resan et al., "Dispersion-Managed Semiconductor Mode-Locked Ring Laser", Optics Letters, Aug. 1, 2003, pp. 1371-1373, vol. 28, No. 15, Optical Society of America.

Schreiber, T., et al., "Design and High Power Operation of a Stress-induced single Polarization Single-transverse Mode LMA Yb-doped Photonic Crystal Fiber," Fiber Lasers III: Technology, Systems, and Applications, Andrew J.W. Brown, Johan Nilsson, Donald J. Harter, Andreas Tünnermann, eds., Proc. of SPIE, vol. 6102, pp. 61020C-1-61020C-9, 2006.

Schreiber, T., et al., "Stress-induced Single-polarization Single-transverse Mode Photonic Crystal Fiber with Low Nonlinearity," Optics Express, vol. 13, No. 19, Sep. 19, 2005, pp. 7621-7630.

Siegman, "Unstable Optical Resonators", Applied Optics, Feb. 1974, pp. 353-367, vol. 13, No. 2.

\* cited by examiner

SYSTEMS AND METHODS FOR CONTROLLING A PULSED LASER BY COMBINING LASER SIGNALS

BACKGROUND

1. Field of the Invention

The present invention relates generally to the field of lasers, and more specifically to controlling a pulsed laser.

2. Related Art

Chirped Pulse Amplification (CPA) is very useful for producing ultra-short duration high-intensity pulses for use in high peak power ultra-short pulse laser systems using an optical amplifier. CPA increases the energy of an ultra-short laser pulse while avoiding optical amplifier damage and excessive nonlinear distortion. In this technique, the duration of the pulse is increased by first dispersing the ultra-short laser pulse temporally as a function of wavelength (a process called "chirping") to produce a chirped pulse, then amplifying the chirped pulse, and then recompressing the chirped pulse to significantly shorten its duration. Stretching the pulse or lengthening the pulse in time reduces the peak power of the pulse and, thus, allows energy to be added to the pulse without incurring excessive nonlinearities or reaching a damage threshold of the optical amplifier and optical components. The amount of pulse amplification that can be achieved is typically proportional to the amount of pulse stretching and compression. Typically, the greater the amount of stretching and compression, the greater the possible pulse amplification.

FIG. 1 is a block diagram illustrating a prior art chirped pulse amplification (CPA) system 100. The CPA system 100 includes a pulsed laser 102, a pulse stretcher 104, an optical amplifier 106, and an optical compressor 108. The pulsed laser 102 generates a pulsed laser signal 110. The pulse stretcher 104 temporally disperses the pulsed laser signal 110 while reducing a peak power of the pulsed laser signal 110 to generate a stretched pulsed laser signal 112. The optical amplifier 106 amplifies the stretched pulsed laser signal 112 to generate an amplified pulsed laser signal 114. Finally, the optical compressor 108 temporally compresses the amplified pulsed laser signal 114 to generate an amplified ultra-short pulsed laser signal 116 at an output of the CPA system 100. The pulse stretcher 104 and the optical compressor 108 are typically configured to have approximately equal but opposite dispersive properties to compensate for one another and minimize a pulse width of the amplified ultra-short pulsed laser signal 116.

Many end-use applications of the CPA system 100 may require an output pulse repetition rate to be controlled. For example, the output pulse repetition rate may need to be lower than a lower limit of the repetition rate of the stretched pulsed laser signal 112 input to the optical amplifier 106 which enables the optical amplifier 106 to maintain stable operation. For some end-use applications, each output pulse may need to be individually triggered. An approach to provide these low repetition rate or individually triggered output pulses is to provide a high power pulse picker (not shown), such as a modulator or an acousto-optic switch, between the optical amplifier 106 and the output of the CPA system 100. The high power pulse picker may be configured to select high power pulses as needed to provide the desired low repetition rate or individually triggered output pulses.

In addition to additional system complexity, the high power pulse picker may have other disadvantages. The high power pulse picker may have low efficiency, which may typically be less than 80%. The high power pulse picker may cause instability of the CPA system 100 and spatial distortions of an output optical beam. The high power pulse picker including its radio-frequency (RF) electronics and power supply may also be bulky and require a significant amount of space relative to the rest of the CPA system 100. Furthermore, the high power pulse picker may create additional heat due to its RF electronics and load.

Accurately directing individually triggered output pulses to a target may be difficult because an exact point of impingement of an output pulse on the target may not be known until after the output pulse impinges on the target. Because each output pulse may have sufficiently high energy which may cause effects such as ablation at the point of impingement on the target, it is desirable for the output pulse to impinge only at the desired target.

SUMMARY

An ultra-short pulsed laser system is provided. The exemplary ultra-short pulsed laser system comprises an optical combiner, an optical amplifier, an optical pulse compressor, and an optical separator. The optical combiner is configured to combine a primary optical pulse with a secondary optical signal to generate a combined optical signal. The primary optical pulse and the secondary optical signal have a distinguishable characteristic, which distinguishes the optical pulse and the secondary optical signal from each other. In exemplary embodiments, the optical amplifier is configured to optically amplify the combined optical signal, while the optical pulse compressor is configured to compress, at least, the primary optical pulse contained within the optically amplified combined optical signal and output a compressed combined optical signal. The exemplary optical separator is configured to separate the compressed combined optical signal into an output primary optical pulse and an output secondary optical signal according to the distinguishable characteristic.

DETAILED DESCRIPTION

Figure 1:
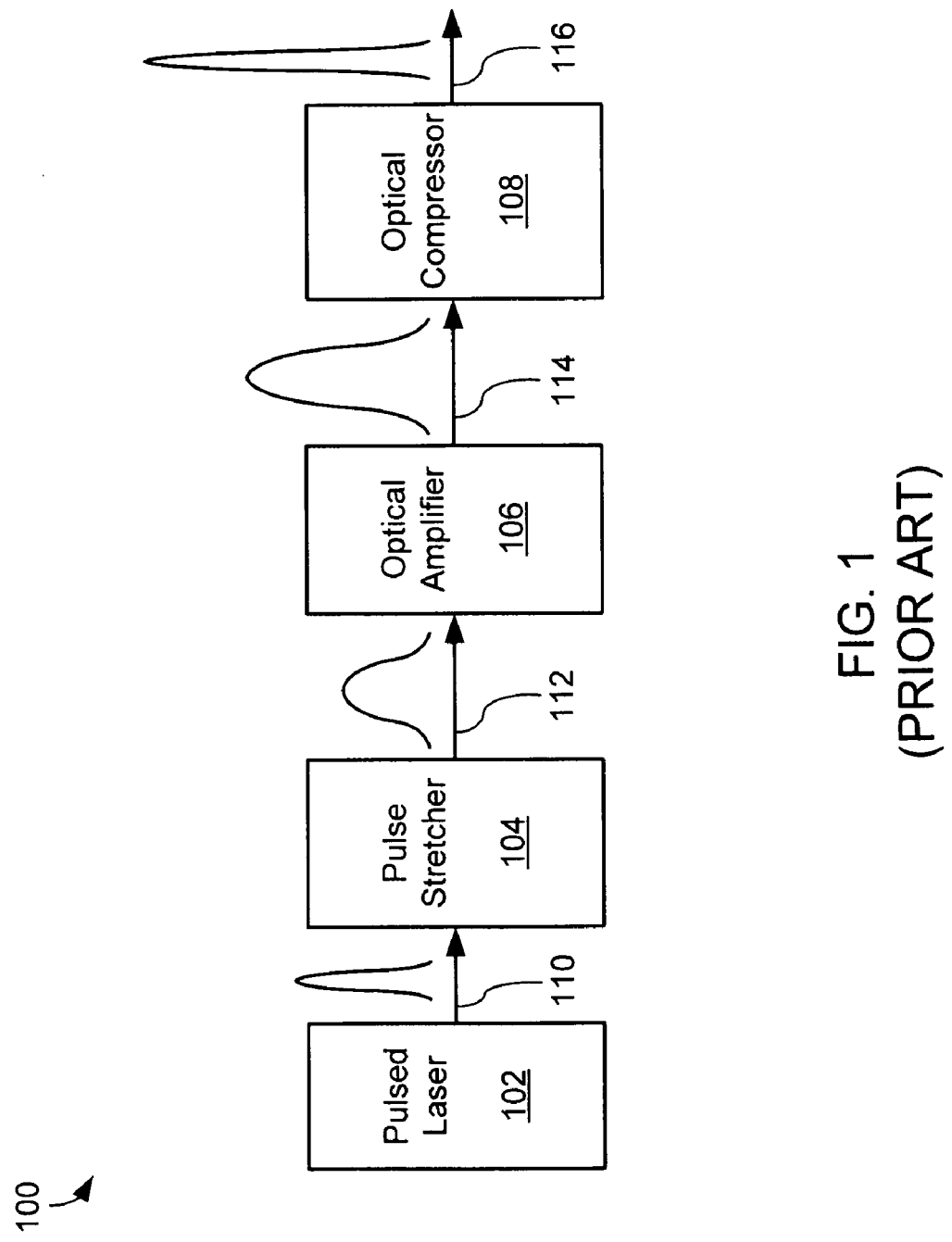
FIG. 1 is a block diagram illustrating a prior art chirped pulse amplification (CPA) system.
Figure 2:
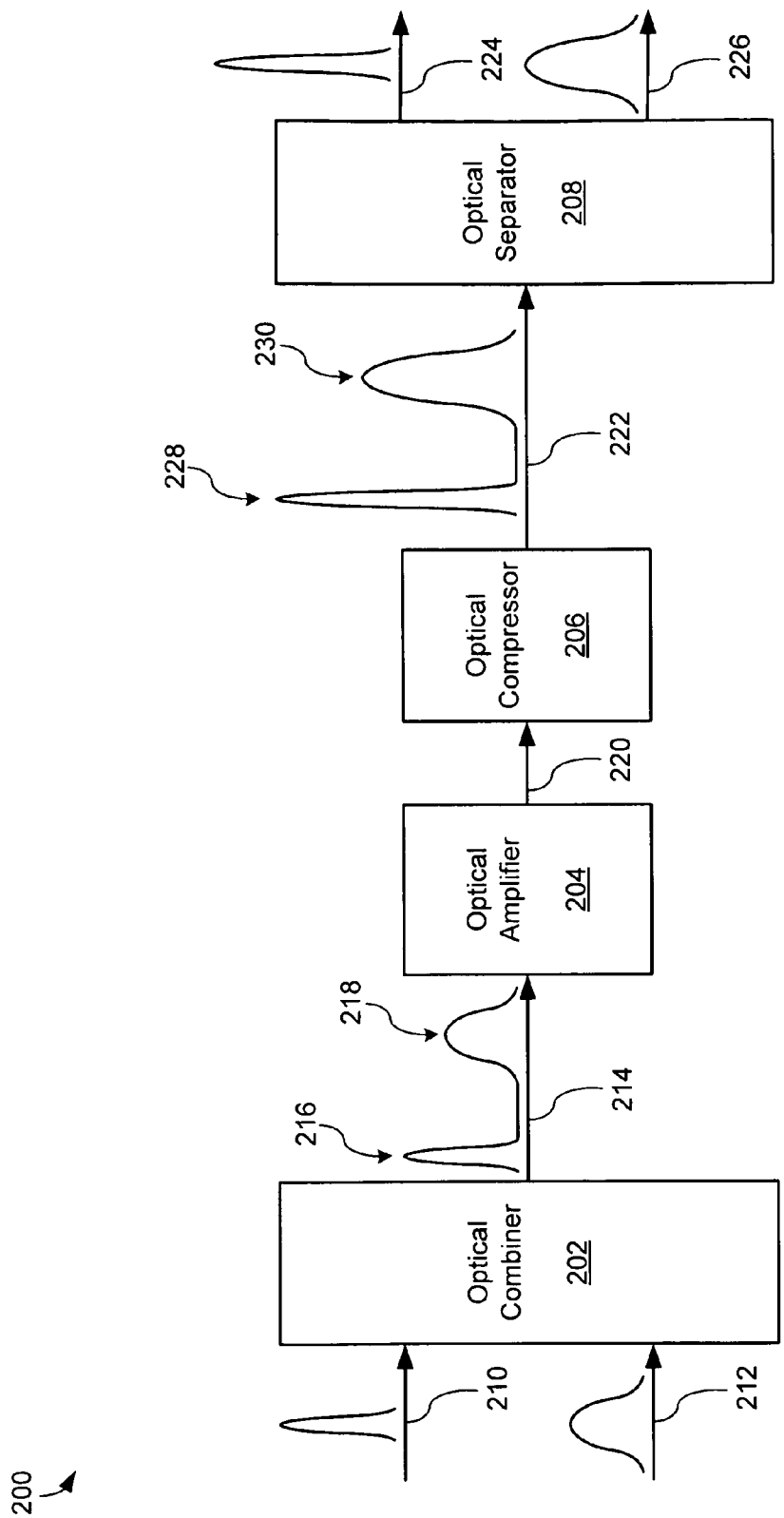
FIG. 2 is a block diagram of an exemplary multiplexed CPA system.

FIG. 2 is a block diagram of an exemplary multiplexed CPA system 200. The multiplexed CPA system 200 comprises an optical combiner 202, an optical amplifier 204, an optical compressor 206, and an optical separator 208. The optical combiner 202 may be configured to combine a primary optical signal 210 and a secondary optical signal 212 into a combined optical signal 214. The optical combiner 202 may include an optical multiplexer, a star coupler, a polarization combiner, coupled optical fibers, optical lenses, or other components configured to spatially combine the primary optical signal 210 and the secondary optical signal 212 into the combined optical signal 214. The combined optical signal 214 may include both a primary optical signal representation 216 and a secondary optical signal representation 218, which may co-propagate within a single optical medium such as an optical waveguide, optical fiber, and/or free space. The combined optical signal 214 may be separable according to a distinguishable characteristic of the primary optical signal representation 216 and the secondary optical signal representation 218.

In exemplary embodiments, the primary optical signal 210 may comprise a pulsed optical signal. The primary optical signal 210 may include an example of the pulsed laser signal 110, and may be generated by a pulsed laser (e.g., the pulsed laser 102). The primary optical signal 210 may be frequency chirped, and may also be temporally dispersed (e.g., by the pulse stretcher 104). In exemplary embodiments, the primary optical signal 210 may have a nanosecond-level duration or a duration of approximately 100 picoseconds (ps) to 10 nanoseconds (ns).

The secondary optical signal 212 may comprise a pulsed optical signal, and may be generated by a semiconductor laser. In some embodiments, the secondary optical signal 212 may comprise pulses which are triggered or initiated by the primary optical signal 210 such that timing and/or duration of the pulses are responsive to the primary optical signal 210. The secondary optical signal 212 may have a lower peak power and/or a longer temporal pulse duration than the primary optical signal 210. In some embodiments, the secondary optical signal 212 may include a time-delayed representation of the primary optical signal 210. Furthermore, pulses included within the secondary optical signal 212 may be configured to be temporally displaced from pulses included within the primary optical signal 210 such that the pulses included within the secondary optical signal 212 do not significantly or measurably overlap in time with the pulses included within the primary optical signal 210.

Each of the primary optical signal 210 and the secondary optical signal 212 may have a primary central wavelength about which essentially all electromagnetic energy included within the primary optical signal 210 or the secondary optical signal 212, respectively, is distributed. Additionally, each of the primary optical signal 210 and the secondary optical signal 212 may have a primary bandwidth including essentially all of the electromagnetic energy included within the primary optical signal 210 or the secondary optical signal 212, respectively, within measurability limitations as known in the art. The primary bandwidth may include a primary −3 dB bandwidth defined by a width of a primary spectral band between a lower primary cutoff wavelength and a higher primary cutoff wavelength. An optical power at each of the lower primary cutoff wavelength and the higher primary cutoff wavelength may be approximately one half (i.e., 50%) of a peak optical power at the primary central wavelength.

The primary optical signal 210 and the secondary optical signal 212 may have a distinguishable characteristic which distinguishes the primary optical signal 210 from the secondary optical signal 212. For example, the primary central wavelength may be distinguishable from the secondary central wavelength. In some embodiments, the primary central wavelength may not overlap with the secondary spectral band, or the secondary central wavelength may not overlap with the primary spectral band. In some embodiments, the primary spectral band and the secondary spectral band may not measurably overlap with one another. In other embodiments, the primary optical signal 210 and the secondary optical signal 212 may have distinguishable and/or orthogonal polarization states.

The optical amplifier 204 may be configured to amplify a power level of the combined optical signal 214 to generate an amplified combined optical signal 220. A gain and/or a noise figure of the optical amplifier 204 may be wavelength-dependent or polarization-dependent. In some embodiments, a gain band of the optical amplifier 204 may include at least a portion of the primary spectral band but not the secondary spectral band.

The exemplary optical amplifier 204 may include a fiber amplifier such as an erbium-doped fiber amplifier (EDFA), thulium doped fiber amplifier (TDFA), or ytterbium doped fiber amplifier. In one embodiment, the optical amplifier 204 may comprise a semiconductor optical amplifier (SOA). In another embodiment, the optical amplifier 204 may comprise the optical amplifier 106. The optical amplifier 204 may include a polarization maintaining waveguide, such as polarization maintaining fiber, configured to maintain a deterministic polarization state of the amplified combined optical signal 220.

The optical amplifier 204 may be configured to amplify both the primary optical signal representation 216 and the secondary optical signal representation 218 included within the combined optical signal 214. In exemplary embodiments, the optical amplifier 204 may amplify the primary optical signal representation 216 and the secondary optical signal representation 218 by different amounts. In some embodiments, the optical amplifier 204 may only amplify the primary optical signal representation 216.

The exemplary optical compressor 206 may be configured to temporally compress, at least, the amplified primary optical signal representation 216 included in the amplified combined optical signal 220 to generate a compressed combined optical signal 222. In one embodiment, the optical compressor 206 may comprise the optical compressor 108. The optical compressor 206 may comprise various optical elements, such as a bulk optical grating and a mirror, and/or be configured as a Treacy compressor.

The compressed combined optical signal 222 may include both an amplified representation of the primary optical signal 228 and an amplified representation of the secondary optical signal 230, which may co-propagate within a single optical medium (e.g., an optical waveguide, optical fiber, and/or free space). Following the optical compressor 206, a pulse width (or temporal duration) of the amplified representation of the primary optical signal 228 may be approximately equal to or less than 10 ps, a few ps, or 1 ps.

The exemplary optical separator 208 may comprise an optical demultiplexer, a star coupler, a polarization splitter, coupled optical fibers, optical lenses, or other components configured to separate the compressed combined optical signal 222 according to the distinguishable characteristic to generate an output primary optical signal 224 and an output secondary optical signal 226. The output primary optical signal 224 may include an amplified representation of the primary optical signal 210. The output secondary optical signal 226 may include a representation of the secondary optical signal 212, which may optionally be amplified. By separating the compressed combined optical signal 222 into the output primary optical signal 224 and the output secondary optical signal 226, each of which may have a lower overall pulse repetition rate than the compressed combined optical signal 222, the optical separator 208 may enable the pulse repetition rate of the combined optical signal 214 input to the optical amplifier 204 to be sufficiently high to ensure stable operation of the multiplexed CPA system 200 while providing a desired lower output repetition rate of the multiplexed CPA system 200. In some embodiments, the optical separator 208 may be positioned prior to the optical compressor 206 and be configured to separate the amplified secondary optical signal representation 218 from the amplified combined optical signal 220 prior to compression by the optical compressor 206.

Figure 3:
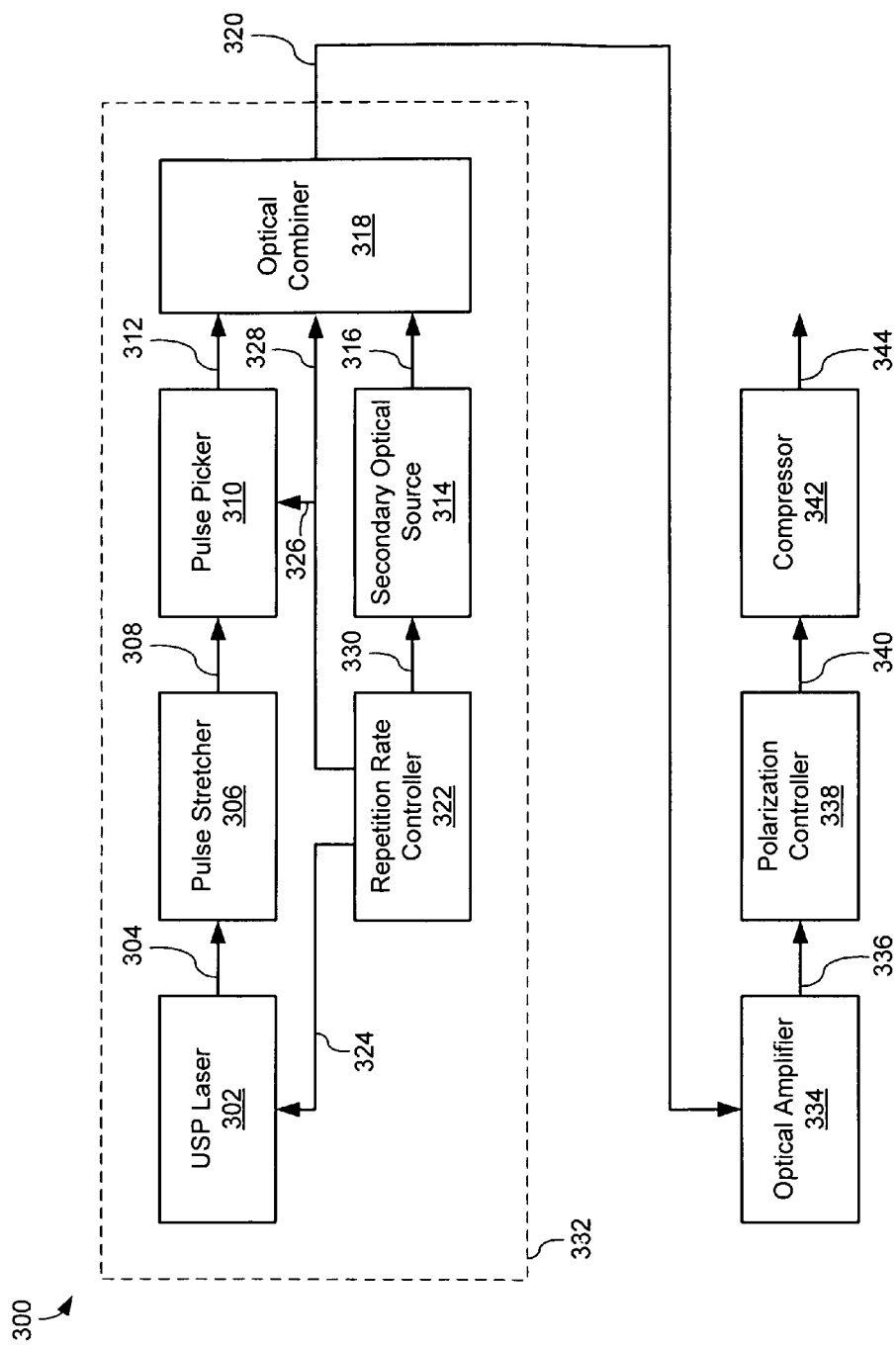
FIG. 3 is a block diagram of another exemplary multiplexed CPA system.

FIG. 3 is a block diagram of another exemplary multiplexed CPA system 300. An ultra-short pulse (USP) laser 302 may generate a pulsed laser signal 304. In some embodiments, the USP laser 302 may comprise the pulsed laser 102, and the pulsed laser signal 304 may comprise the pulsed laser signal 110. The pulsed laser signal 304 may have a pulse width ranging between approximately less than 1 ps to a few ps.

A pulse stretcher 306 may be configured to temporally stretch the pulsed laser signal 304 to generate a stretched pulsed laser signal 308. The pulse stretcher 306 may stretch the pulsed laser signal 304 such that a peak power of the stretched pulsed laser signal 308 is reduced compared to a corresponding peak power of the pulsed laser signal 304. The reduced peak power may avoid optical damage and/or excessive nonlinearities during amplification of the stretched pulsed laser signal 308. The pulse stretcher 306 may stretch the pulsed laser signal 304 by a factor on the order of 100 to 1000 or more such that the stretched pulsed laser signal 308 may have a nanosecond-level pulse width, such as between approximately 100 ps and 10 ns. In some embodiments, the pulse stretcher 306 may comprise the pulse stretcher 104. The pulse stretcher 306 may include an optical fiber, a fiber Bragg grating, a Bragg waveguide, and/or a bulk optical grating.

An exemplary pulse picker 310 may downsample the stretched pulsed laser signal 308, or selectively block or pass individual pulses within the stretched pulsed laser signal 308, to generate a downsampled pulsed laser signal 312. The downsampled pulsed laser signal 312 may have a lower repetition rate than the stretched pulsed laser signal 308. In some embodiments, the pulse picker 310 is utilized when a repetition rate of the USP laser 302 exceeds a desired output repetition rate of the multiplexed CPA system 300. For example, the USP laser 302 may operate at a repetition rate of between 10 MHz to more than 2 GHz. Because of high output powers, it may be desirable to operate the multiplexed CPA system 300 at an output repetition rate of less than 1 MHz.

In exemplary embodiments, a secondary optical source 314 is configured to generate a secondary optical signal 316. The secondary optical source 314 may include a semiconductor laser, which may be directly modulated, or may be operated as a continuous wave (CW) laser followed by an optical modulator (e.g., a Mach-Zehnder modulator or electro-absorption (EA) modulator). In some embodiments, the secondary optical source 314 may include more than one optical source. The secondary optical signal 316 may comprise the secondary optical signal 212.

The secondary optical signal 316 may comprise a pulsed optical signal. Accordingly, a peak power, temporal duration, and repetition rate of the pulsed optical signal within the secondary optical signal 316 may be dynamically modified according to changes in a peak power, temporal duration, and repetition rate of the downsampled pulsed laser signal 312.

The multiplexed CPA system 300 may also comprise an optical combiner 318, which is configured to combine the downsampled pulsed laser signal 312 and the secondary optical signal 316 to generate a combined optical signal 320. In doing so, the optical combiner 318 may selectively combine optical pulses within the downsampled pulsed laser signal 312 and the secondary optical signal 316. In one embodiment, the optical combiner 318 may comprise the optical combiner 202, and the combined optical signal 320 may comprise the combined optical signal 214.

A repetition rate controller 322 may be used to control a repetition rate of the downsampled pulsed laser signal 312 and/or a repetition rate of the secondary optical signal 316. In exemplary embodiments, the repetition rate controller 322 may control and/or trigger the USP laser 302 via a laser control signal 324, the pulse picker 310 via a pulse picker control signal 326, the optical combiner 318 via a combiner control signal 328, and/or the secondary optical source 314 via a secondary source control signal 330. Examples of factors the repetition rate controller 322 may control include optical power, pulse timing, pulse duration, optical attenuation, optical amplification factor, and optical filter characteristics such as magnitude and phase versus wavelength. The functionality of the repetition rate controller 322 may be distributed among a plurality of components in alternate embodiments.

In some embodiments, the repetition rate controller 322 may synchronize or coordinate operation of the USP laser 302, pulse picker 310, secondary optical source 314, and/or optical combiner 318. For example, the repetition rate controller 322 may control timing of an optical pulse within the downsampled pulsed laser signal 312 and an optical pulse within the secondary optical signal 316 in relation to one another. The USP laser 302, pulse stretcher 306, pulse picker 310, secondary optical source 314, optical combiner 318, and repetition rate controller 322 may collectively be referred to as an optical signal combining system 332, in exemplary embodiments.

An optical amplifier 334 amplifies a power level of the combined optical signal 320 received from the optical signal combining system 332 to generate an amplified combined optical signal 336. The optical amplifier 334 may comprise the optical amplifier 204. Stable operation of the optical amplifier 334 may require that the combined optical signal 320 include optical pulses having a sufficiently uniform pulse energy and temporal spacing. Some variation in the pulse energy and temporal spacing of optical pulses within the combined optical signal 320 may be acceptable subject to dynamic behavior of the optical amplifier 334 in response to the combined optical signal 320. Therefore, the combined optical signal 320 may be configured to have sufficient uniformity in the pulse energy and temporal spacing of optical pulses subject to the acceptable variations.

A pulse energy of an optical pulse within the secondary optical signal 316 may be sufficiently similar or approximately equal to a pulse energy of the optical pulse within the downsampled pulsed laser signal 312 to ensure stable operation of the optical amplifier 334. The peak power of the optical pulse within the secondary optical signal 316 may be decreased relative to the optical pulse within the downsampled pulsed laser signal 312, while the temporal duration is increased, to maintain the approximately equal pulse energy. In various embodiments, the temporal duration may be increased greater than 5 times, 10 times, 50 times, 100 times, or 1000 times. For example, the optical pulse within the secondary optical signal 316 may have a peak power ranging from 1 mW, to 10 mW, to 1 W. The secondary optical source 314 may be configured to generate the optical pulse within the secondary optical signal 316 such that the pulse energy is approximately 0.1 nanojoule (nJ) to 1 nJ. Therefore, for a 1 ns duration optical pulse, the peak power of the optical pulse may be required to be approximately 0.1 to 1 W. By increasing the duration of the optical pulse, the peak power required may be reduced. For example, a 10 to 100 ns duration optical pulse may be required to have a peak power of 10 mW to produce the optical pulse having a pulse energy of approximately 0.1 nJ to 1 nJ.

The secondary optical source 314 may have a linewidth or bandwidth configured to be sufficiently wide to limit stimulated Brillouin scattering (SBS) effects within the optical amplifier 334. Peak power levels within a single mode fiber of a high gain fiber amplifier may be limited by SBS. SBS may be caused by single frequency or narrow bandwidth lasers such as distributed feedback (DFB) lasers, since SBS may have a narrow resonance frequency range. Because the downsampled pulsed laser signal 312 may have a broad spectrum, the downsampled pulsed laser signal 312 may not cause problematic SBS within the optical amplifier 334. To prevent SBS due to the secondary optical source 314, the secondary optical source 314 may include a component capable of producing a broad spectrum pulse (e.g., a Fabry-Perot laser diode). The Fabry Perot laser diode may create a pulse having multiple optical modes and/or a frequency chirp to suppress SBS within the optical amplifier 334.

In some embodiments, the optical amplifier 334 may include an array of optical amplifiers to provide increased amplification. In these embodiments, all optical amplifiers within the array may receive and/or amplify the secondary optical signal 316 as well as the downsampled pulsed laser signal 312. In these embodiments, each optical amplifier in the array need not receive a separate secondary optical signal train similar to the secondary optical signal 316 from other optical amplifiers in the array of optical amplifiers. Additionally, the secondary optical signal 316 does not need to be switched to be routed to one optical amplifier instead of another optical amplifier in the array.

Several characteristics of rare earth element doped fibers (e.g., EDFAs) are particularly beneficial for applications of fiber amplifiers which include rare earth element doped fibers in chirped pulse amplifier (CPA) systems such as the multiplexed CPA system 300. Because an extensive length of a rare earth element doped optical fiber may be a gain medium, fiber amplifiers may provide a high level of optical gain due to long regions of interaction between an input optical signal, (e.g., the combined optical signal 320), and the gain medium. The high level of optical gain may enable the fiber amplifier to be effective at amplifying low level input optical signals. Also, because the rare earth element dopants in the optical fiber gain medium may have a long lifetime, the optical fiber gain medium can store energy from an optical pump enabling the optical fiber gain medium to be effective at amplifying a pulsed optical signal having a low repetition rate. Therefore, an energy level of an individual output pulse may be very high even at a much lower fixed average output power. At a given fixed average output power, the energy level of the individual output pulse may scale inversely with the pulse repetition rate.

The fiber amplifier's performance in the multiplexed CPA system 300 may be strongly dependent upon the pulse repetition rate of the downsampled pulsed laser signal 312. If the pulse repetition rate of the downsampled pulsed laser signal 312 is high (e.g., several hundred MHz), the optical fiber gain medium may have a relatively low level of stored energy between each individual pulse of the downsampled pulsed laser signal 312. Therefore, an amplification level of the downsampled pulsed laser signal 312 may be similar to an amplification level of a continuous wave (CW) optical signal. If the pulse repetition rate of the downsampled pulsed laser signal 312 is lower (e.g., between approximately 100 kHz and 100 MHz), the optical fiber gain medium may have a relatively high level of stored energy between each individual pulse of the downsampled pulsed laser signal 312. Therefore, an amplification level of the downsampled pulsed laser signal 312 may be high.

For lower repetition rates of the downsampled pulsed laser signal 312, undesirable side effects of the fiber amplifier's high amplification level may negatively impact the fiber amplifier's performance. For example, the high amplification level may cause spontaneous emission of the fiber amplifier to be strongly amplified. Strong amplified spontaneous emission (ASE) may deplete the stored energy between the individual pulses of the downsampled pulsed laser signal 312, which may lead to spurious lasing due to small reflections in an optical path of the fiber amplifier. In an EDFA, the depletion of the stored energy may happen at repetition rates as low as 100 kHz and lower. The spurious lasing may include strong bursts of very high energy output, similar to an output of a Q-switched laser, which can cause damage to the optical fiber gain medium, input optical fiber, output optical fiber, or other optical components sharing an optical path with these components.

Embodiments may provide the desired low output pulse repetition rate or individually triggered output pulses while simultaneously maintaining stable operation of the multiplexed CPA system 300. These embodiments may include a single pulse picker 310 and no high power pulse picker downstream from the optical amplifier 334. The repetition rate controller 322 may control the pulse picker 310 to provide the desired output pulse repetition rate. To compensate for the repetition rate of the downsampled pulsed laser signal 312 being lower than required for stable operation of the optical amplifier 334, the repetition rate controller 322 may control the secondary optical source 314 to generate the secondary optical signal 316. The optical combiner 318 combines the secondary optical signal 316 with the downsampled pulsed laser signal 312 to generate the combined optical signal 320 to input to the optical amplifier 334. Individual pulses within the downsampled pulsed laser signal 312 and the secondary optical signal 316 may be offset from one another in time.

Polarization control may be performed on the amplified combined optical signal 336 by an optional polarization controller 338. The polarization controller 338 may include one or more polarization waveplates which may be rotated to change a polarization state of the amplified combined optical signal 336 to generate a polarization controlled optical signal 340 having the changed polarization state. The polarization state of the polarization controlled optical signal 340 may be measured while randomly rotating or dithering the one or more polarization waveplates and then adjusting the rotation of the waveplates to achieve the desired polarization state of the polarization controlled optical signal 340.

A compressor 342 may be used to compress the polarization controlled optical signal 340, or alternatively the amplified combined optical signal 336 (when the optional polarization controller 338 is not present in the multiplexed CPA system 300), to generate an output pulsed signal 344. The compressor 342 may be configured to use a representation of the secondary optical signal 316 within the polarization controlled optical signal 340 to perform active alignment of individual elements within the compressor 342. For example, when there is no representation of the downsampled pulsed laser signal 312 propagating through the compressor 342, the representation of the secondary optical signal 316 may be used by the compressor 342 to generate a control signal to actively align the individual elements within the compressor 342. The control signal may be generated using optical sensors to detect the alignment of the representation of the secondary optical signal 316 relative to the individual elements within the compressor 342. The individual elements within the compressor 342 may be actively aligned by positioning elements based on the control signal. For alignment purposes, the central wavelength of the secondary optical signal 316 should be sufficiently close to the central wavelength of the downsampled pulsed laser signal 312 to ensure that the downsampled pulsed laser signal 312 and the secondary optical signal 316 travel a similar optical path through the compressor 342.

Figure 4A:
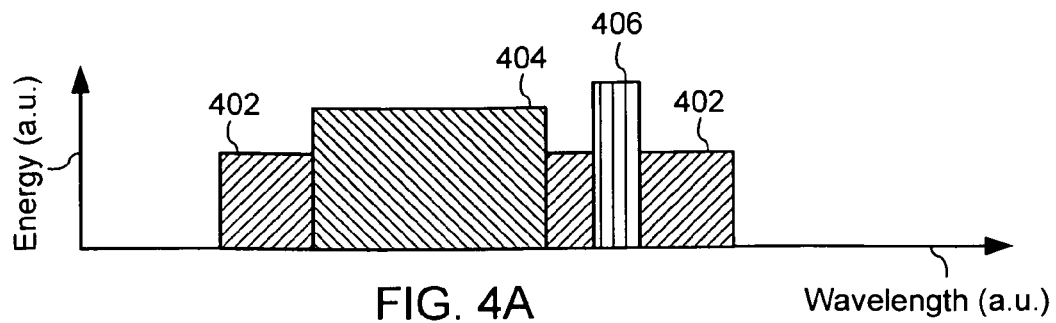
FIGS. 4A-4C illustrate alternative secondary spectral bands relative to a primary spectral band.
Figure 4B:
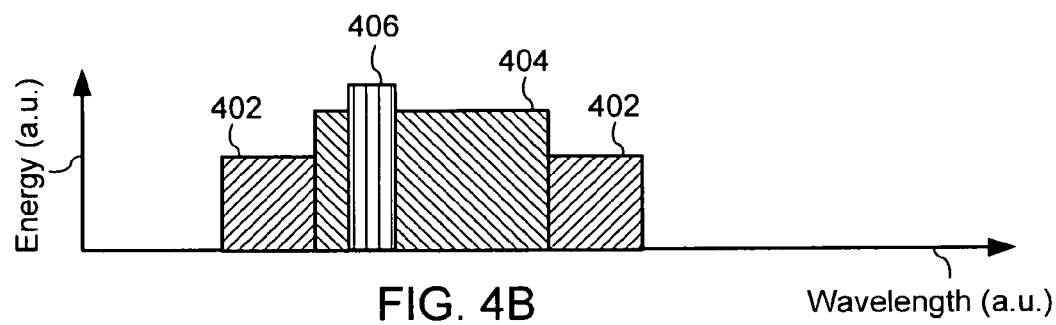
Figure 4C:
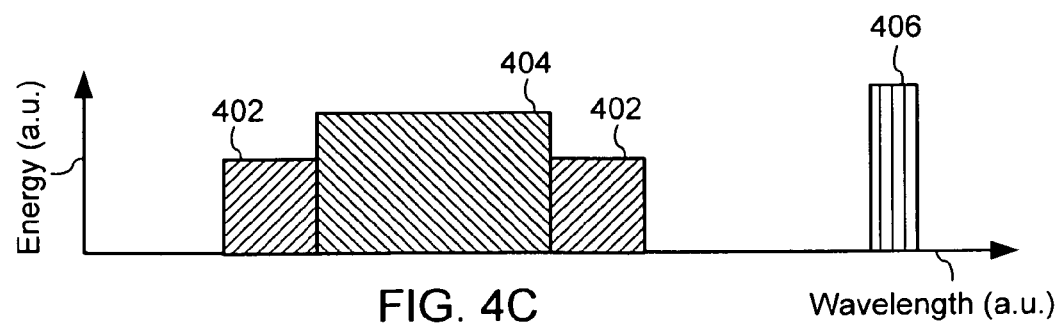

FIGS. 4A-4C illustrate alternative secondary spectral bands 406 relative to a primary spectral band 404. A bandwidth of an optical amplifier gain band 402 of the optical amplifier 334 may be limited to be as narrow as possible in order to reduce ASE. In exemplary embodiments, bandpass optical filters (not shown) may be inserted between multiple fiber amplifiers within the optical amplifier 334 or at the input or output of the optical amplifier 334. The bandpass filters may be configured to have a bandwidth sufficiently wide to pass the representations of the downsampled pulsed laser signal 312 and secondary optical signal 316 within the combined optical signal 320 with insignificant or essentially no distortion. A bandwidth of the downsampled pulsed laser signal 312 may be inversely proportional to a pulse width of the downsampled pulsed laser signal 312. Likewise, a bandwidth of the secondary optical signal 316 may be inversely proportional to a pulse width of the secondary optical signal 316. The primary central wavelength and the secondary central wavelength may also be configured to be close to one another to reduce the required bandwidth of the optical amplifier gain band 402. As illustrated in FIG. 4A, the primary spectral band 404 may be close to, yet distinct from, the secondary spectral band 406, while both spectral bands may be within the optical amplifier gain band 402.

The downsampled pulsed laser signal 312 and the secondary optical signal 316 may be polarization combined in order to enable the primary spectral band 404 to overlap with the secondary spectral band 406. As illustrated in FIG. 4B, overlapping both spectral bands may further reduce the required bandwidth of the optical amplifier gain band 402. Furthermore, overlapping spectral bands may enable the representations of the downsampled pulsed laser signal 312 and secondary optical signal 316 to be unaffected by any wavelength-dependent gain within the optical amplifier 334. Therefore, the representations of the downsampled pulsed laser signal 312 and secondary optical signal 316 may be amplified by the optical amplifier 334 with essentially a same amplification factor regardless of any wavelength-dependent gain.

If polarization combining is not used, as illustrated in FIG. 4A, unequal amplification factors applied to the representations of the downsampled pulsed laser signal 312 and secondary optical signal 316 within the optical amplifier 334 may need to be compensated for by adjusting power levels of the downsampled pulsed laser signal 312 and the secondary optical signal 316 relative to one another. An embodiment of the multiplexed CPA system 300 employing polarization combining of the downsampled pulsed laser signal 312 and the secondary optical signal 316 may need to include polarization maintaining (PM) waveguides and PM optical fiber within the optical path where the combined optical signal 320 propagates to minimize coupling between the representations of the downsampled pulsed laser signal 312 and secondary optical signal 316.

In some embodiments, as illustrated in FIG. 4C, the secondary spectral band 406 may be outside the optical amplifier gain band 402. In these embodiments, the optical amplifier gain band 402 may be further minimized to reduce ASE. Applications of these embodiments, which may not require that the representation of the secondary optical signal 316 be used to stabilize the optical amplifier 334, are described herein.

Figure 5A:
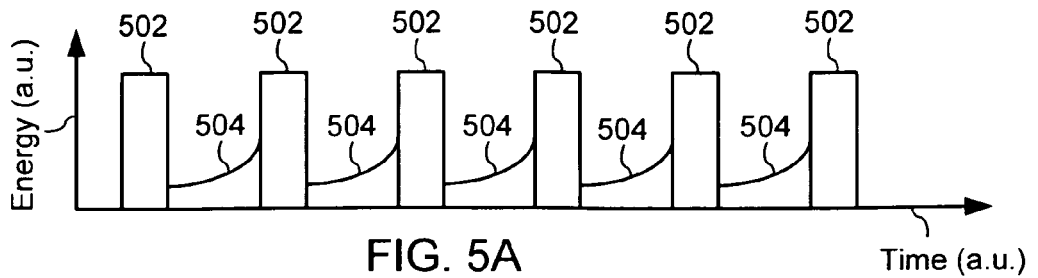
FIG. 5A illustrates fiber amplifier gain medium energy storage in relation to primary optical pulse timing.

FIG. 5A illustrates fiber amplifier gain medium energy storage in relation to primary optical pulse timing. Between each primary optical pulse 502, a value of energy storage 504 rises from an end of one primary optical pulse 502 to a start of a next primary optical pulse 502. A level of amplification of each primary optical pulse 502 may be dependent upon the value of the energy storage 504 present at the start of the primary optical pulse 502. As illustrated, stable operation of the optical amplifier 334 provides an essentially consistent power level among all output primary optical pulses 502 when the primary optical pulses 502 are approximately equally spaced.

Figure 5B:
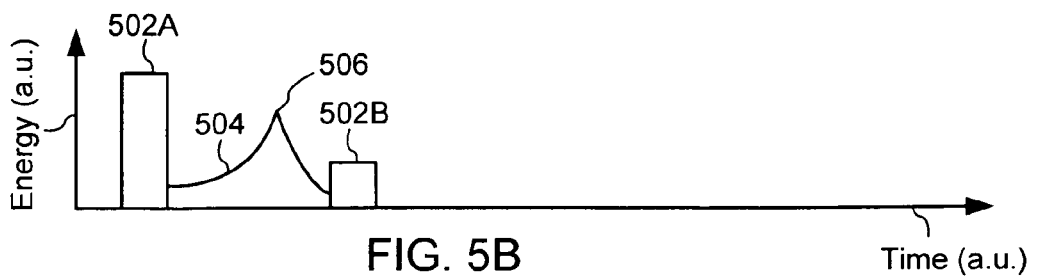
FIG. 5B illustrates self-lasing due to fiber amplifier gain medium energy storage in relation to primary optical pulse timing.

FIG. 5B illustrates self-lasing due to fiber amplifier gain medium energy storage in relation to primary optical pulse timing. As illustrated, a first primary optical pulse 502A is separated in time from a second primary optical pulse 502B by a longer period of time than that illustrated in FIG. 5A. As a result of the elapsed time between the end of the first primary optical pulse 502A and the start of the second primary optical pulse 502B, the value of the energy storage 504 rises to a maximum energy storage level 506 at which self-lasing may begin. The self-lasing may result in a sharp decline in the value of the energy storage 504 until the start of the second primary optical pulse 502B and unstable operation of the optical amplifier 334. Due to the reduction in the value of the energy storage 504, the optical amplifier 334 may provide a lower level of amplification to the second primary optical pulse 502B than to the first primary optical pulse 502A. Unstable operation of the optical amplifier 334 may provide an inconsistent power level among all output primary optical pulses 502.

Figure 5C:
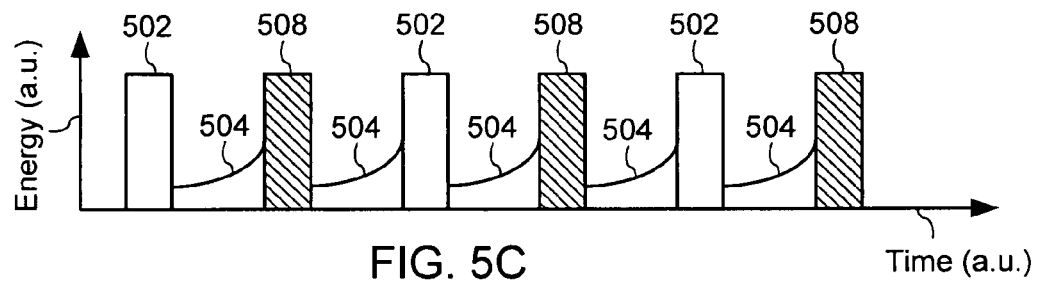
FIG. 5C illustrates fiber amplifier gain medium energy storage in relation to alternating primary optical pulse and secondary optical pulse timing.

FIG. 5C illustrates fiber amplifier gain medium energy storage in relation to alternating primary optical pulse and secondary optical pulse timing. As shown, a train of secondary optical pulses 508 (e.g., produced by the secondary optical source 314), may be combined with a train of primary optical pulses 502 to provide a combined pulse repetition rate that enables stable operation of the optical amplifier 334. This may be used when a repetition rate of the primary optical pulse 502 alone may be too low to enable stable operation of the optical amplifier 334. The primary optical pulse 502 may alternate with the secondary optical pulse 508 such that the combined optical pulse repetition rate is twice that of the primary optical pulse 502 alone. The combined optical pulse repetition rate illustrated in FIG. 5C may be approximately equal to the optical pulse repetition rate of the train of primary optical pulses 502 alone in FIG. 5A. By alternating the primary optical pulse 502 with the secondary optical pulse 508 in FIG. 5C, the self lasing illustrated in FIG. 5B may be suppressed. The secondary optical pulse 508 may have a distinguishable characteristic compared with the primary optical pulse 502 (e.g., a different central wavelength, a different state of polarization), but have a same effect on the optical amplifier gain medium as the primary optical pulse 502. By separating the train of primary optical pulses 502 from the train of secondary optical pulses 508 at the output of the multiplexed CPA system 300 using the distinguishable characteristic, a second high power pulse picker may not be required to generate the desired low output pulse repetition rate as required by some applications.

Figure 5D:
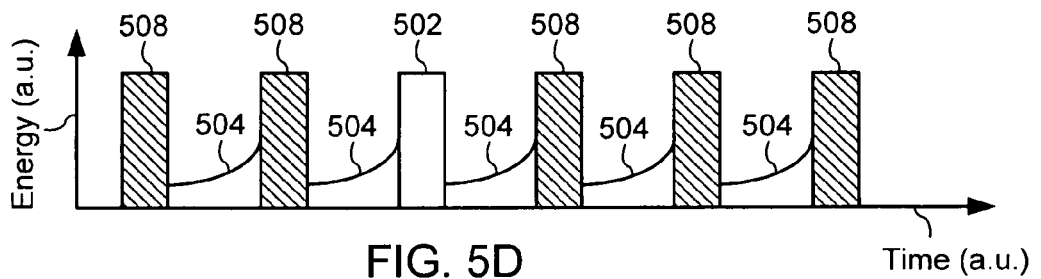
FIG. 5D illustrates fiber amplifier gain medium energy storage in relation to variable primary optical pulse and secondary optical pulse timing.

FIG. 5D illustrates fiber amplifier gain medium energy storage in relation to variable primary and secondary optical pulse timing. As illustrated in FIG. 5D, an interleaving ratio between the train of primary optical pulses 502 and the train of secondary optical pulses 508 need not be fixed at 1:1 as illustrated in FIG. 5C. For example, the ratio may be 1:2, 1:3, 1:4, to the extreme of a single primary optical pulse 502 triggered to be generated against a backdrop of a train of unlimited secondary optical pulses 508. If all primary optical pulses 502 were replaced with secondary optical pulses 508, the multiplexed CPA system 300 may not output the primary optical pulse 502, but may maintain a ready status to generate and output the primary optical pulse 502 on demand. All primary optical pulses 502 may be replaced with secondary optical pulses 508 when the multiplexed CPA system 300 initially begins operation or warms up to avoid outputting the primary optical pulse 502 until the multiplexed CPA system 300 has reached a steady operational state.

Figure 5E:
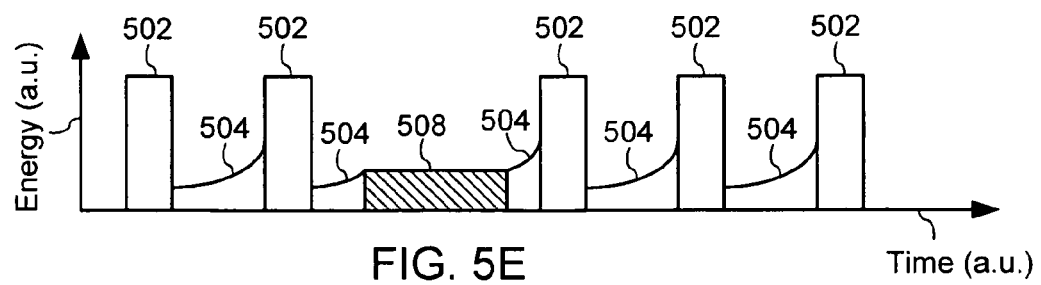
FIG. 5E illustrates fiber amplifier gain medium energy storage in relation to variable primary optical pulse and secondary optical pulse timing and intensity.

FIG. 5E illustrates fiber amplifier gain medium energy storage in relation to variable primary and secondary optical pulse timing and intensity. As shown, the secondary optical pulse 508 may differ from the primary optical pulse 502 in power level and temporal duration, among other factors. For example, the secondary optical pulse 508 may have a longer temporal duration than the primary optical pulse 502 and a lower peak power level, while maintaining a total pulse energy essentially equal to the total pulse energy of the primary optical pulse 502. While the primary optical pulse 502 may be chirped, the secondary optical pulse 508 may not be.

Typically, a time duration between subsequent primary optical pulses 502 is much longer than a pulse duration of the primary optical pulse 502. For example, the primary optical pulse 502 may be approximately 1 ns in duration, while a time duration between subsequent primary optical pulses 502 may be 1 µs or a factor of 1000 longer. Therefore, the timing and pulse duration of the secondary optical pulse 508 may not need to match the primary optical pulse 502 to achieve the desired stability of the optical amplifier 334. Consequently, the secondary optical source 314 used to generate the secondary optical pulse 508 may be different from, and less expensive than, the USP laser 302 used to generate the primary optical pulse 502.

Figure 6:
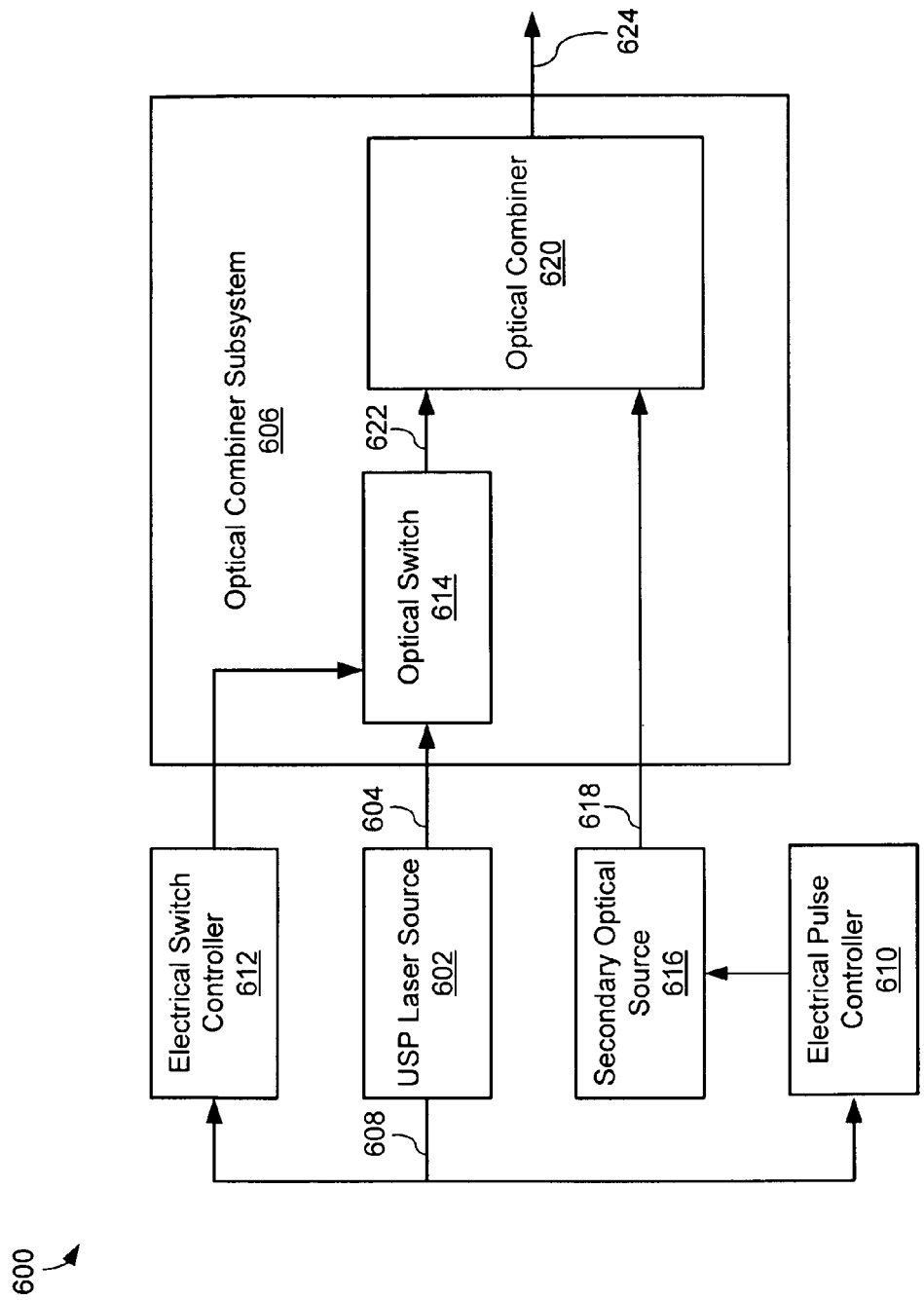
FIG. 6 is a block diagram of an exemplary optical pulse combining system.

FIG. 6 is a block diagram an exemplary optical pulse combining system 600. In one embodiment, the optical pulse combining system 600 may comprise the optical signal combining system 332. The optical pulse combining system 600 may include a USP laser source 602 which may output a primary optical pulse train 604 to an optical combiner subsystem 606. The USP laser source 602 may comprise the USP laser 302 and the pulse stretcher 306.

The USP laser source 602 may also output a trigger signal 608 to both an electrical pulse controller 610 and an electrical switch controller 612. The electrical switch controller 612 may be configured to control an optical switch 614 to selectively pass or block individual optical pulses within the primary optical pulse train 604 according to a value of the trigger signal 608. The electrical pulse controller 610 may be configured to control a secondary optical source 616 to generate a secondary optical pulse train 618 which may have an individually triggered optical pulse, a repetition rate, and/or a timing relative to the primary optical pulse train 604 according to the value of the trigger signal 608. The electrical switch controller 612 and the electrical pulse controller 610 may be configured to be synchronized or coordinated with one another using the trigger signal 608 to interleave optical pulses within the primary and secondary optical pulse trains 604 and 618 as may be desired.

The optical combiner subsystem 606 may include an optical combiner 620 and the optical switch 614. In some embodiments, the optical switch 614 may comprise the pulse picker 310. The optical combiner 620 may combine a downsampled primary optical pulse train 622 generated by the optical switch 614 with the secondary optical pulse train 618 to generate a combined optical pulse train 624. The combined optical pulse train 624 may comprise the combined optical signal 320.

The optical pulse combining system 600 may be configured to electronically synchronize the primary and secondary optical pulse trains 604 and 618. Electronic synchronization of the primary and secondary optical pulse trains 604 and 618 may enable control of timing differences between individual pulses of the primary and secondary optical pulse trains 604 and 618 to reduce or minimize differences in values of the energy storage 504 between different pairs of individual pulses. By reducing these differences in values of the energy storage 504, variations in pulse energy between individual pulses within the primary optical pulse train 604 may be reduced because differences in an amplification factor applied to each pulse may be reduced by the optical amplifier 334.

Figure 7:
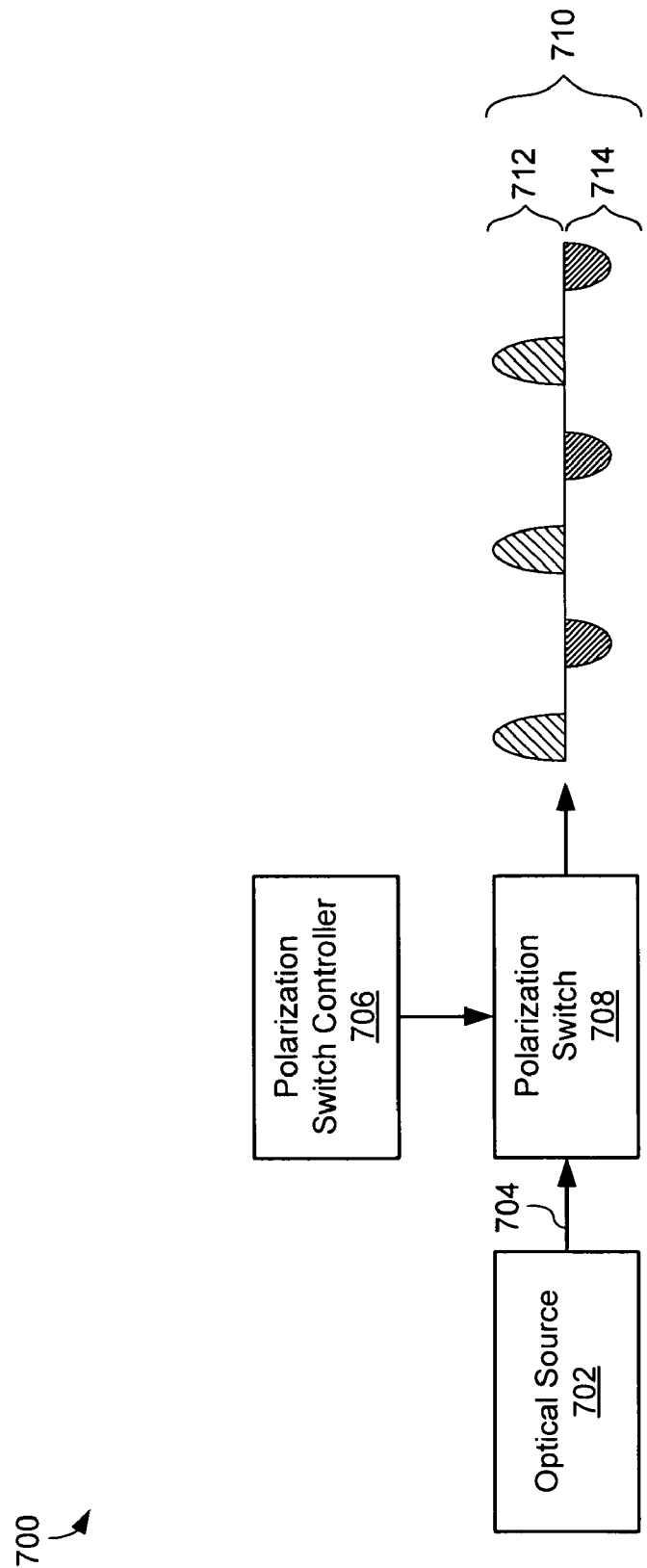
FIG. 7 illustrates an exemplary polarized optical pulse combining system.

FIG. 7 illustrates an exemplary polarized optical pulse combining system 700. The polarized optical pulse combining system 700 may be used in place of the optical signal combining system 332. The polarized optical pulse combining system 700 includes an optical source 702. In one embodiment, the optical source 702 may comprise the USP laser 302. The optical source 702 may further comprise the pulse stretcher 306 and/or the pulse picker 310. The optical source 702 may generate an optical pulse train 704 having a single polarization state. In one embodiment, the polarized optical pulse combining system 700 is orthogonally polarized.

A polarization switch controller 706 may be configured to control a polarization switch 708 to selectively pass or orthogonally polarize individual pulses within the optical pulse train 704 to generate a selectively orthogonally polarized optical pulse train 710. The polarization switch 708 may include an electro-optic modulator in some embodiments.

Each individual pulse within the selectively orthogonally polarized optical pulse train 710 may have an unchanged polarization state compared to a corresponding individual pulse within the optical pulse train 704, or have an orthogonally changed polarization state compared to the corresponding individual pulse within the optical pulse train 704. The selectively orthogonally polarized optical pulse train 710 may correspond to the combined optical signal 320. A sequence of individual pulses within the optical pulse train 712 with unchanged polarization states may correspond to the downsampled pulsed laser signal 312. Likewise, a sequence of individual pulses within the optical pulse train 714 with orthogonally changed polarization states may correspond to the secondary optical signal 316. The polarization switch controller 706 may be configured to control a repetition rate of the individual pulses within the optical pulse train 712 by controlling the polarization switch 708 to change the polarization state of individual pulses to generate the sequence of individual pulses within the optical pulse train 714.

When utilized in conjunction with the multiplexed CPA system 300, the polarized optical pulse combining system 700 may reduce complexity and cost of the multiplexed CPA system 300 because a secondary optical source (e.g., the secondary optical source 314) may not be required to generate the secondary optical signal 316, and synchronization may also not be not required. Furthermore, the optical pulse trains 712 and 714 may be amplified by a same amplification factor in the optical amplifier 334. This is possible because the optical pulse trains 712 and 714 may have an approximately same central wavelength. Additional variations between individual pulses of the optical pulse trains 712 and 714 may not be a concern because the individual pulses of the optical pulse trains 712 and 714 may be identical except for their states of polarization.

Furthermore, SBS within the optical amplifier 334 may not be a concern when using the polarized optical pulse combining system 700 because the optical pulse trains 712 and 714 may have a same SBS suppressing bandwidth. However, an optical path where the selectively orthogonally polarized optical pulse train 710 propagates, or the optical pulse trains 712 and 714 co-propagate (e.g., the optical amplifier 334), may need to include PM optical fiber to prevent polarization coupling between the optical pulse trains 712 and 714. An embodiment of the multiplexed CPA system 300 utilizing the polarized optical pulse combining system 700 may use a polarizing beam splitter to separate the optical pulse trains 712 and 714 from the selectively orthogonally polarized optical pulse train 710.

Figure 8:
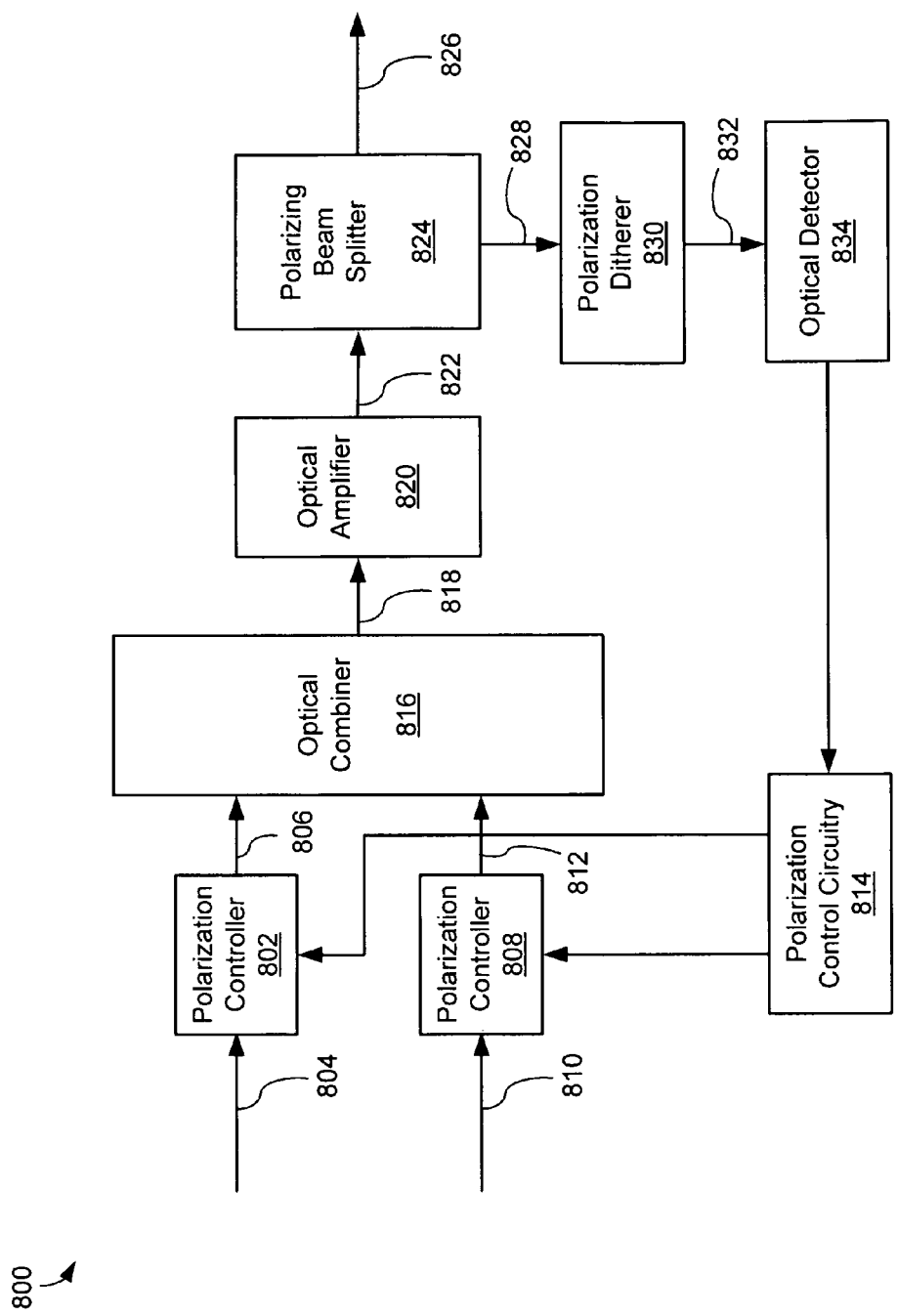
FIG. 8 is a block diagram of an exemplary polarization control system.

FIG. 8 is a block diagram of an exemplary polarization control system 800. The polarization control system 800 may be utilized in conjunction with a CPA system (e.g., the multiplexed CPA system 300) that includes an optical amplifier that is not polarization maintaining. In an optical amplifier which is not polarization maintaining, an output signal from the optical amplifier may be polarized but have a polarization state which changes or wanders over time. Because some techniques for optical compression in a CPA system may be polarization-sensitive, an apparatus and method for controlling polarization in the optical amplifier may be desirable. When used in conjunction with the multiplexed CPA system 300, the polarization control system 800 may provide polarization control of a primary optical signal (e.g., the downsampled pulsed laser signal 312) in the optical amplifier 334.

A disadvantage of the polarization control method described with reference to the polarization controller 338 is that dithering the one or more polarization waveplates may cause power fluctuations in the polarization controlled optical signal 340. The polarization control system 800 may avoid these power fluctuations by dithering the polarization of a secondary optical signal (e.g., a representation of the secondary optical signal 316) instead of a primary optical signal (e.g., a representation of the downsampled pulsed laser signal 312).

The polarization control system 800 may include a polarization controller 802 configured to control a polarization state of a primary optical signal 804 to generate a polarization controlled primary optical signal 806. The primary optical signal 804 may comprise the downsampled pulsed laser signal 312.

The polarization control system 800 may also include a polarization controller 808 configured to control a polarization state of a secondary optical signal 810 to generate a polarization controlled secondary optical signal 812. In some embodiments, the secondary optical signal 810 may comprise the secondary optical signal 316.

The polarization control system 800 may further include polarization control circuitry 814 configured to control the polarization controllers 802 and 808 such that a polarization state of the polarization controlled primary optical signal 806 approximately matches a polarization state of the polarization controlled secondary optical signal 812.

An optical combiner 816 may optically combine the polarization controlled primary optical signal 806 and the polarization controlled secondary optical signal 812 to generate a combined polarization controlled optical signal 818. In one embodiment, the optical combiner 816 may comprise the optical combiner 318.

An optical amplifier 820 may be configured to optically amplify the combined polarization controlled optical signal 818 and generate an amplified combined polarization controlled optical signal 822. The optical amplifier 820 may comprise the optical amplifier 334.

Subsequently, a polarizing beam splitter 824 may use polarization state as a distinguishable characteristic to separate the amplified combined polarization controlled optical signal 822 into a polarization controlled output optical signal 826 and a polarization controlled secondary output optical signal 828. The polarization controlled secondary output optical signal 828 may include at least a portion of a representation of the polarization controlled secondary optical signal 812, and may be directed to a polarization ditherer 830. In some embodiments, the polarization controlled output optical signal 826 may contain essentially no remnants of the representation of the polarization controlled secondary optical signal 812. In other embodiments, only a small portion of the representation of the polarization controlled secondary optical signal 812 is removed from the polarization controlled output optical signal 826 and output as part of the polarization controlled secondary output optical signal 828 by the polarizing beam splitter 824.

The polarization ditherer 830 may comprise one or more polarization waveplates which may be rotated to change a polarization state of the polarization controlled secondary output optical signal 828 to generate a polarization dithered secondary output optical signal 832. A polarization state of the polarization dithered secondary output optical signal 832 may be measured by an optical detector 834 while randomly rotating or dithering the one or more polarization waveplates. The optical detector 834 may report information related to the measured polarization state of the polarization dithered secondary output optical signal 832 to the polarization control circuitry 814 according to exemplary embodiments.

The polarization control circuitry 814 may then control both the polarization controller 802 and the polarization controller 808 to set the polarization of both the polarization controlled primary optical signal 806 and the polarization controlled secondary optical signal 812, respectively. In some embodiments, the polarization state of the polarization controlled primary optical signal 806 may be made to match the polarization state of the polarization controlled secondary optical signal 812. In other embodiments, the change in polarization state of the polarization controlled primary optical signal 806 may be controlled to match the change in polarization state of the polarization controlled secondary optical signal 812. The polarization state of the polarization controlled primary optical signal 806 may be set without polarization dithering of a representation of the polarization controlled primary optical signal 806, and therefore, without power fluctuations of the representation of the polarization controlled primary optical signal 806 that would otherwise be caused by polarization dithering. As such, the polarization controlled output optical signal 826 may be stable without power fluctuations due to polarization dithering of the polarization controlled secondary output optical signal 828.

For configurations in which the secondary optical signal 810 is not required for further purposes beyond setting the polarization state of the polarization controlled primary optical signal 806, the polarization control system 800 may enable a spectral band of the secondary optical signal 810 (e.g., secondary spectral band 406) to lie outside a gain bandwidth of the optical amplifier 820 (e.g., optical amplifier gain band 402). In this configuration, the optical amplifier 820 may have a narrower gain bandwidth, and consequently less ASE, than a configuration in which the optical amplifier gain band 402 includes the secondary spectral band 406. Furthermore, the polarization controlled secondary optical signal 812 may have enhanced stability because an amplitude of the polarization controlled secondary optical signal 812 may not be dependent upon a gain of the optical amplifier 820.

Figure 9:
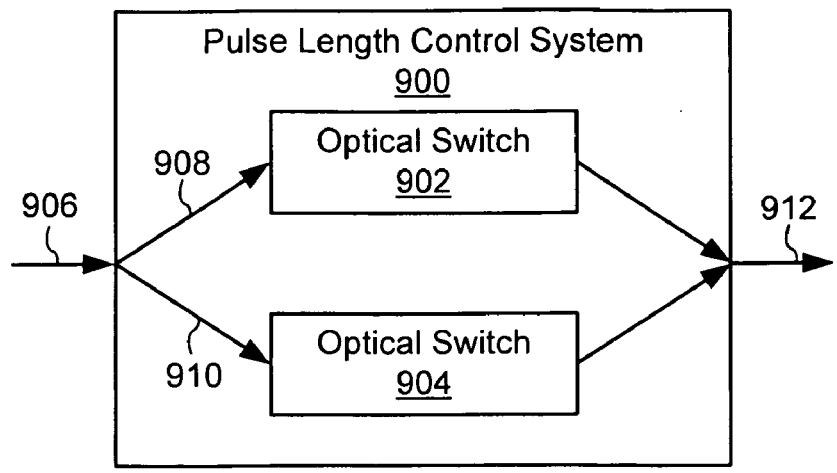
FIG. 9 illustrates an exemplary pulse length control system.

FIG. 9 illustrates an exemplary pulse length control system 900. In one embodiment, the pulse length control system 900 may comprise the optical separator 208. The pulse length control system 900 may be used in the multiplexed CPA system 300 following the compressor 342 to control a pulse length output from the multiplexed CPA system 300. The pulse length control system 900 may include optical switches 902 and 904 configured in parallel. The pulse length control system 900 may be configured to split an input combined optical signal 906 (e.g., output pulsed signal 344) into a split primary optical signal 908 and a split secondary optical signal 910. The pulse length control system 900 may be configured to split the combined optical signal 906 according to a distinguishable characteristic such as wavelength or polarization. Additionally, the pulse length control system 900 may be configured to control the optical switches 902 and 904 such that the pulse length control system 900 may only output either the split primary optical signal 908 or the split secondary optical signal 910 as an output signal 912.

The multiplexed CPA system 300 further including the pulse length control system 900 following the compressor 342 may be configured to output either the split primary optical signal 908 or the split secondary optical signal 910 as the output signal 912. Therefore, the multiplexed CPA system 300 may include a dual mode laser. For example, when the pulse length control system 900 is configured to output the split primary optical signal 908, the output signal 912 may include an ultra-short laser pulse with a pulse duration approximately equal to, or less than, 10 ps or 1 ps duration. Alternatively, when the pulse length control system 900 is configured to output the split secondary optical signal 910, the output signal 912 may include a CW laser signal, a Q-switched pulsed laser signal, or a laser pulse with a pulse duration approximately equal to, or greater than, 1 ns, depending on the properties of the split secondary optical signal 910. Therefore, the addition of the pulse length control system 900 may enable the multiplexed CPA system 300 to operate in multiple modes.

In some applications, a laser pulse with a 1 ps duration and a laser pulse with a 1 ns duration may have very different effects on a target, even if the 1 ps duration pulse and the 1 ns duration pulse are configured to have an approximately same total pulse energy. For example, the 1 ps duration pulse may create an ablation effect with essentially no thermal effects on the target. On the other hand, the 1 ns duration pulse may cause thermal effects on the target without ablation effects. Therefore, the embodiment of the multiplexed CPA system 300 including the pulse length control system 900 may be used to cause different machining effects on the same target, or may be used on a variety of different targets with different laser pulse requirements, simply by switching between the split primary optical signal 908 and the split secondary optical signal 910.

Figure 10:
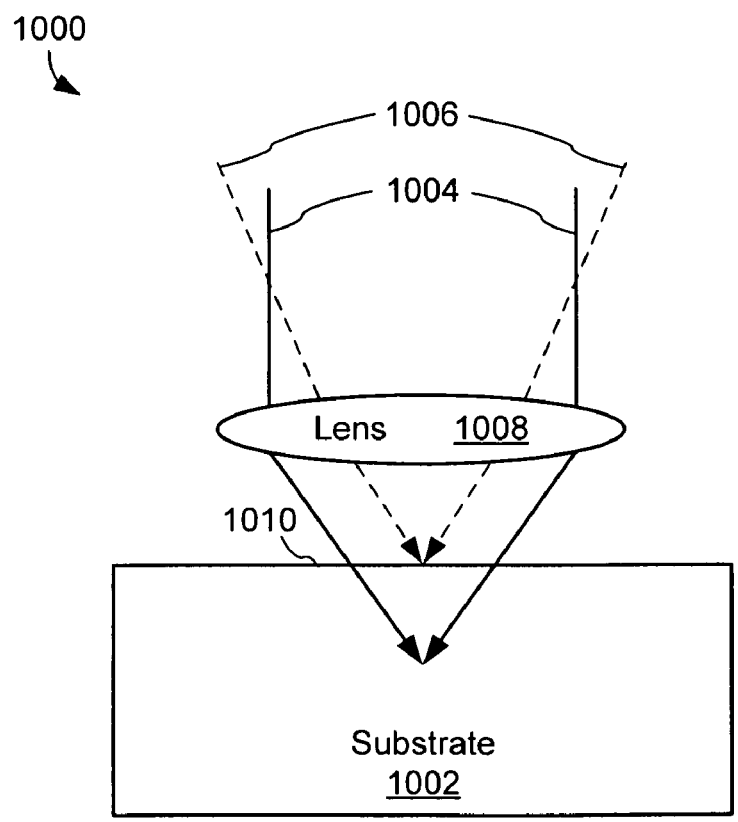
FIG. 10 illustrates an exemplary target alignment system.

FIG. 10 illustrates an exemplary target alignment system 1000. The target alignment system 1000 may be used in conjunction with the multiplexed CPA system 300 and, optionally, additional optical waveguides and/or lens arrangements to direct the output pulsed signal 344 toward a target (e.g., a substrate 1002). As such, the target alignment system 1000 may direct a primary optical beam 1004 and a secondary optical beam 1006 toward the substrate 1002. The primary optical beam 1004 may include a representation of the downsampled pulsed laser signal 312, which may be included within the output pulsed signal 344. The secondary optical beam 1006 may include a representation of the secondary optical signal 316, which may also be included within the output pulsed signal 344.

The target alignment system 1000 may be configured to enable a user to direct the primary optical beam 1004 toward a region of the substrate 1002 by using the secondary optical beam 1006 as an alignment aid. For example, the primary optical beam 1004 may include an invisible laser beam, while the secondary optical beam 1006 may include a visible laser beam. The user of the target alignment system 1000 may use the visible secondary optical beam 1006 to target the region of the substrate 1002 for the purpose of directing the invisible primary optical beam 1004 toward the targeted region of the substrate 1002.

The primary optical beam 1004 and the secondary optical beam 1006 may have a different central wavelength or other characteristic which may cause the optical beams 1004 and 1006 to have a different focal point after passing through a lens 1008. In some embodiments, the target alignment system 1000 may be configured to focus the primary optical beam 1004 to a depth below a substrate surface 1010, while the secondary optical beam 1006 is focused on the substrate surface 1010. In other embodiments, a lens arrangement or other components may be included to direct the optical beams 1004 and 1006 to a coincident target point on the substrate 1002. In still other embodiments, the target alignment system 1000 may include an example of the optical separator 208.

As another example, the secondary optical beam 1006 may be used to target the substrate 1002 at a time when the primary optical beam 1004 is not present. After the secondary optical beam 1006 is properly aligned to the target, the primary optical beam 1004 may be activated toward the target. In this way, the target alignment system 1000 may enable pre-alignment of the primary optical beam 1004 with the target using the secondary optical beam 1006 before the primary optical beam 1004 is activated, thereby preventing potential damage to the substrate 1002 due to the primary optical beam 1004 being improperly aligned with the target.

In other embodiments, the target alignment system 1000 may be configured to offset a target coordinate of the primary optical beam 1004 on the substrate 1002 from a target coordinate of the secondary optical beam 1006 on the substrate 1002. The offset between the target coordinates may be in an arbitrary direction (e.g., in an x direction, a y direction, a z direction, or any combination thereof). In some embodiments, the offset may be deterministic. A deterministic offset may be useful in that measurements of a reflection from the substrate 1002 of the secondary optical beam 1006 may be used to maintain proper target alignment of the secondary optical beam 1006. Consequently, the secondary optical beam 1006 may be used to maintain proper target alignment of the primary optical beam 1004.

When the target alignment system 1000 is configured to use the secondary optical beam 1006 as an aid for targeting the primary optical beam 1004 onto the substrate 1002, the central wavelength of the secondary optical signal 316 included in the secondary optical beam 1006 may be outside the optical amplifier gain band of the optical amplifier 334. By having the central wavelength of the secondary optical signal 316 outside the optical amplifier gain band, ASE from the optical amplifier may be reduced and stability of the secondary optical signal 316 may be improved.

The secondary optical signal 316 may be used in any combination of the pulse length control system 900, the target alignment system 1000, the polarization controller 338, the polarization control system 800, the compressor 342 for alignment control, and stabilization of the optical amplifier 334 using repetition rate control. These various combinations of uses may be established using appropriate adjustments to the distinguishable characteristics between the downsampled pulsed laser signal 312 and the secondary optical signal 316 such as wavelength and/or state of polarization.

Figure 11:
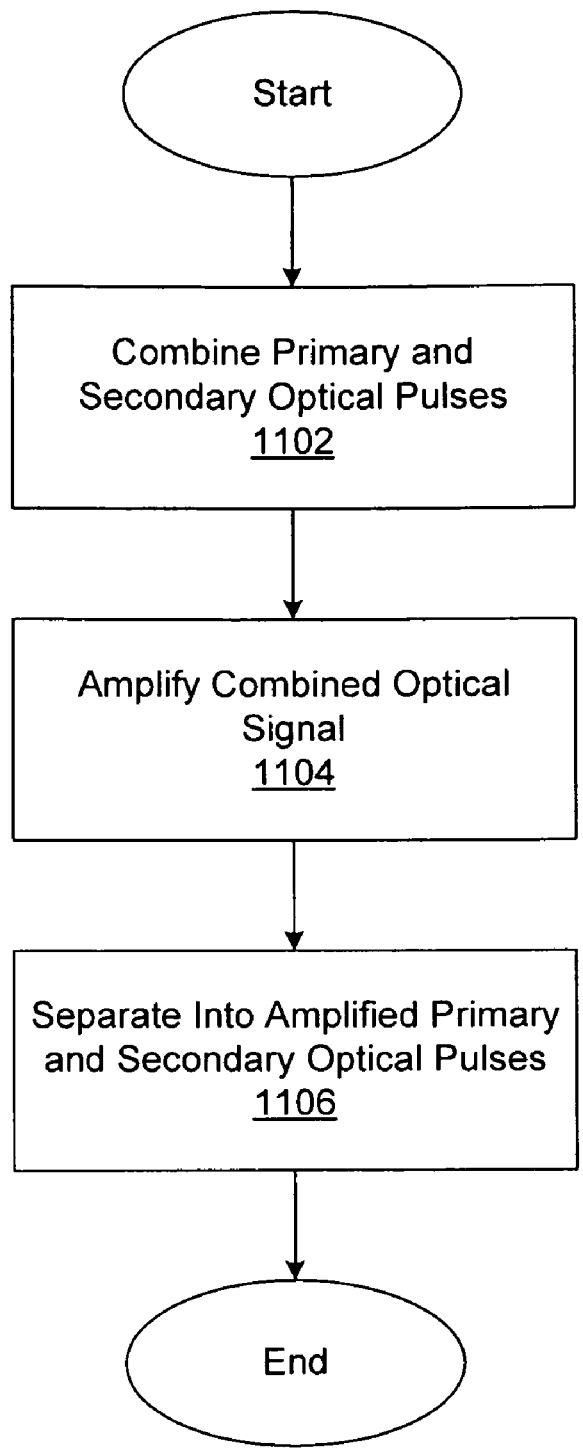
FIG. 11 is a flow chart of an exemplary method of amplifying an optical signal.

FIG. 11 is a flowchart of an exemplary method of amplifying an optical signal. The optical signal may include primary and secondary optical pulses having a distinguishable characteristic. In step 1102, the primary and secondary optical pulses are combined into a combined optical signal. An optical combiner (e.g., the optical combiner 318) may be used to combine the primary and secondary optical pulses. The primary and secondary optical pulses may have a distinguishable characteristic, such as a different central wavelength or state of polarization. In some embodiments, the primary and secondary optical pulses may be displaced in time, such that a time window may include the primary optical pulse and not the secondary optical pulse, or vice versa. Additionally, there may be a sequence of time windows, each of which may include either another instance of the primary or the secondary optical pulse. Each of the time windows in the sequence may have an approximately equal duration. A repetition rate of the primary optical pulse may be controlled based on a repetition rate of the secondary optical pulse, or vice-versa. Furthermore, the secondary optical pulse may be triggered using the primary optical pulse.

In step 1104, the combined optical signal is amplified using an optical amplifier (e.g., the optical amplifier 334) to generate an amplified combined optical signal. A spectral band of the primary optical pulse (e.g., primary spectral band 404) and a spectral band of the secondary optical pulse (e.g., secondary spectral band 406) may both be within a gain band of the optical amplifier (e.g., optical amplifier gain band 402). A timing, duration, and peak power of the secondary optical pulse may be configured to maintain an approximately constant gain of the optical amplifier independent of a duration of time between two temporally adjacent instances of the primary optical pulse. In some embodiments, the primary spectral band 404 within the combined optical signal is within the optical amplifier gain band 402, while the secondary spectral band 406 within the combined optical signal is not. In these embodiments, only the primary optical pulse may be amplified, while the secondary optical pulse may be attenuated, to generate the amplified combined optical signal.

In step 1106, the amplified combined optical signal may be separated into an amplified primary optical pulse and an amplified secondary optical pulse. An optical separator (e.g., the optical separator 208) may be used to separate the amplified combined optical signal using the distinguishable characteristic of the primary and secondary optical pulses. The separation into the amplified primary optical pulse and the amplified secondary optical pulse may be performed based on a state of polarization using a polarization splitter, or based on wavelength using a wavelength demultiplexer (e.g., a grating or a lens).

The amplified primary optical pulse and/or the amplified secondary optical pulse may be directed toward a target. The amplified secondary optical pulse may be used to direct the amplified primary optical pulse toward a target. In some embodiments, the amplified secondary optical pulse has a lower power level than the secondary optical pulse input to the optical amplifier because the secondary spectral band 406 is not within the optical amplifier gain band 402.

The embodiments illustrated, described, and discussed herein are illustrative of the present invention. As these embodiments of the present invention are described with reference to illustrations, various modifications or adaptations of the methods and or specific structures described may become apparent to those skilled in the art. It will be appreciated that modifications and variations are covered by the above teachings and within the scope of the appended claims without departing from the spirit and intended scope thereof. All such modifications, adaptations, or variations that rely upon the teachings of the present invention, and through which these teachings have advanced the art, are considered to be within the spirit and scope of the present invention. Hence, these descriptions and drawings should not be considered in a limiting sense, as it is understood that the present invention is in no way limited to only the embodiments illustrated.

What is claimed is:

1. A method comprising:
    combining a primary optical pulse with a secondary optical pulse into a combined optical signal, the primary optical pulse and the secondary optical pulse having a distinguishable characteristic, and either the primary optical pulse or the secondary optical pulse being present within a single time window out of a sequence of time windows of approximately equal duration;
    optically amplifying the combined optical signal using an optical fiber amplifier;
    separating the amplified combined optical signal into an amplified primary optical pulse and an amplified secondary optical pulse according to the distinguishable characteristic; and
    controlling a repetition rate of the amplified primary optical pulse using a repetition rate of the secondary optical pulse.

2. The method of claim 1, further comprising maintaining an approximately constant gain of the optical fiber amplifier independent of a duration of time between two temporally adjacent instances of the primary optical pulse.

3. The method of claim 1, further comprising triggering the secondary optical pulse using the primary optical pulse.

4. The method of claim 1, further comprising dithering a state of polarization of the amplified secondary optical pulse, measuring a state of polarization of the polarization dithered amplified secondary optical pulse, and controlling a state of polarization of the primary optical pulse and a state of polarization of the secondary optical pulse based upon the measured state of polarization of the polarization dithered amplified secondary optical pulse.

5. The method of claim 1, further comprising selecting between the amplified primary optical pulse and the amplified secondary optical pulse, and directing the selected pulse to a target.

6. The method of claim 5, wherein a pulse duration of the amplified primary optical pulse is less than 10 picoseconds and a pulse duration of the amplified secondary optical pulse is greater than 1 nanosecond.

7. The method of claim 1, wherein the distinguishable characteristic is state of polarization.

8. A method comprising:
combining a primary optical pulse with a secondary optical pulse into a combined optical signal, the primary optical pulse and the secondary optical pulse having a distinguishable characteristic, and either the primary optical pulse or the secondary optical pulse being present within a single time window out of a sequence of time windows of approximately equal duration;
optically amplifying the combined optical signal using an optical fiber amplifier;
separating the amplified combined optical signal into an amplified primary optical pulse and an amplified secondary optical pulse according to the distinguishable characteristic;
dithering a state of polarization of the amplified secondary optical pulse;
measuring a state of polarization of the polarization dithered amplified secondary optical pulse; and
controlling a state of polarization of the primary optical pulse and a state of polarization of the secondary optical pulse based upon the measured state of polarization of the polarization dithered amplified secondary optical pulse.

9. The method of claim 8, further comprising maintaining an approximately constant gain of the optical fiber amplifier independent of a duration of time between two temporally adjacent instances of the primary optical pulse.

10. The method of claim 8, further comprising controlling a repetition rate of the amplified primary optical pulse using a repetition rate of the secondary optical pulse.

11. The method of claim 8, further comprising triggering the secondary optical pulse using the primary optical pulse.

12. The method of claim 8, further comprising selecting between the amplified primary optical pulse and the amplified secondary optical pulse, and directing the selected pulse to a target.

13. The method of claim 12, wherein a pulse duration of the amplified primary optical pulse is less than 10 picoseconds and a pulse duration of the amplified secondary optical pulse is greater than 1 nanosecond.

14. The method of claim 8, wherein the distinguishable characteristic is state of polarization.

15. A method comprising:
combining a primary optical pulse with a secondary optical pulse into a combined optical signal, the primary optical pulse and the secondary optical pulse having a distinguishable characteristic, and either the primary optical pulse or the secondary optical pulse being present within a single time window out of a sequence of time windows of approximately equal duration;
optically amplifying the combined optical signal using an optical fiber amplifier;
separating the amplified combined optical signal into an amplified primary optical pulse and an amplified secondary optical pulse according to the distinguishable characteristic;
selecting between the amplified primary optical pulse and the amplified secondary optical pulse; and
directing the selected pulse to a target, wherein a pulse duration of the amplified primary optical pulse is less than 10 picoseconds and a pulse duration of the amplified secondary optical pulse is greater than 1 nanosecond.

16. The method of claim 15, further comprising maintaining an approximately constant gain of the optical fiber amplifier independent of a duration of time between two temporally adjacent instances of the primary optical pulse.

17. The method of claim 15, further comprising controlling a repetition rate of the amplified primary optical pulse using a repetition rate of the secondary optical pulse.

18. The method of claim 15, further comprising triggering the secondary optical pulse using the primary optical pulse.

19. The method of claim 15, further comprising dithering a state of polarization of the amplified secondary optical pulse, measuring a state of polarization of the polarization dithered amplified secondary optical pulse, and controlling a state of polarization of the primary optical pulse and a state of polarization of the secondary optical pulse based upon the measured state of polarization of the polarization dithered amplified secondary optical pulse.

20. The method of claim 15, wherein the distinguishable characteristic is state of polarization.

* * * * *